US010728129B2

(12) United States Patent
Tidwell et al.

(10) Patent No.: US 10,728,129 B2
(45) Date of Patent: Jul. 28, 2020

(54) APPARATUS AND METHODS FOR IDENTIFYING AND CHARACTERIZING LATENCY IN A CONTENT DELIVERY NETWORK

(71) Applicant: Time Warner Cable Enterprises LLC, New York, NY (US)

(72) Inventors: Justin Tidwell, Waxhaw, NC (US); Eduardo Samame, Rowayton, CT (US); Craig Engel, Shamong, NJ (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 450 days.

(21) Appl. No.: 14/589,947

(22) Filed: Jan. 5, 2015

(65) Prior Publication Data
US 2015/0188794 A1 Jul. 2, 2015

Related U.S. Application Data

(62) Division of application No. 12/944,648, filed on Nov. 11, 2010, now Pat. No. 8,930,979.

(51) Int. Cl.
*H04H 60/32* (2008.01)
*H04L 12/26* (2006.01)
(Continued)

(52) U.S. Cl.
CPC ........ *H04L 43/0864* (2013.01); *H04L 7/0054* (2013.01); *H04N 21/25833* (2013.01);
(Continued)

(58) Field of Classification Search
CPC ....... H04N 21/26283; H04N 21/26241; H04N 21/47; H04N 21/478; H04N 21/4821; H04N 21/4381
(Continued)

(56) References Cited

U.S. PATENT DOCUMENTS 6,389,538 B1 5/2002 Gruse et al.
7,174,126 B2 2/2007 McElhatten et al.
(Continued)

OTHER PUBLICATIONS

Denning et al. (Cryptography and data security, Addison-Wesley Publishing Company, ISBN 0-201-10150-5, 1982).
(Continued)

*Primary Examiner* — Jivka A Rabovianski
(74) *Attorney, Agent, or Firm* — Gadzdzinski & Associates, PC

(57) ABSTRACT

Methods and apparatus for identification and characterization of latency in a content delivery network. In one embodiment, interaction of users with content is recorded via the collection of a plurality of tuning records; the latency is then utilize to adjust the timing on the tuning records to account for lapses in time for sending these from between entities of the network and the user devices, and for processing occurring at the devices as required. The latency is determined by taking into account an experimentally or manufacturer-derived device specific latency component, and a network latency component. The network latency component is determined in one variant by sending a message to the device from the network requesting a current system time (or other response). Once the timing of the tuning records is adjusted, these tuning records may be relied upon as being accurate representations of subscriber interaction with content on a second-by-second basis. Accordingly, tuning records may be obtained and analyzed for content which lasts for very short periods of time (e.g. advertisements).

22 Claims, 15 Drawing Sheets

(51) Int. Cl.
  *H04N 21/258* (2011.01)
  *H04N 21/262* (2011.01)
  *H04N 21/6587* (2011.01)
  *H04L 7/00* (2006.01)
  *H04H 20/12* (2008.01)
  *H04H 60/33* (2008.01)
  *H04N 21/20* (2011.01)

(52) U.S. Cl.
  CPC ..... *H04N 21/2625* (2013.01); *H04N 21/6587* (2013.01); *H04H 20/12* (2013.01); *H04H 60/33* (2013.01); *H04N 21/20* (2013.01)

(58) Field of Classification Search
  USPC .......................... 725/17, 32, 41, 14, 93, 136
  See application file for complete search history.

(56) References Cited

U.S. PATENT DOCUMENTS

| | | | |
|---|---|---|---|
| 7,213,036 | B2 | 5/2007 | Apparao et al. |
| 7,242,988 | B1 | 7/2007 | Hoffberg et al. |
| 7,363,643 | B2 | 4/2008 | Drake et al. |
| 7,444,655 | B2 | 10/2008 | Sardera |
| 7,457,520 | B2 | 11/2008 | Rossetti et al. |
| 7,567,983 | B2 | 7/2009 | Pickelsimer et al. |
| 7,602,820 | B2 | 10/2009 | Helms et al. |
| 7,650,319 | B2 | 1/2010 | Hoffberg et al. |
| 7,900,052 | B2 | 3/2011 | Jonas et al. |
| 7,954,131 | B2 | 5/2011 | Cholas et al. |
| 8,244,909 | B1 * | 8/2012 | Hanson ................ H04L 45/12 370/235 |
| 8,347,341 | B2 | 1/2013 | Markley et al. |
| 8,484,511 | B2 | 7/2013 | Engel et al. |
| 8,855,469 | B2 * | 10/2014 | Maharajh ......... G06F 17/30035 386/205 |
| 9,215,423 | B2 | 12/2015 | Kimble et al. |
| 2002/0133513 | A1 * | 9/2002 | Townsend ......... G06F 17/30017 715/203 |
| 2003/0016627 | A1 * | 1/2003 | MeLampy ........ H04L 29/06027 370/235 |
| 2003/0056217 | A1 | 3/2003 | Brooks |
| 2003/0220100 | A1 | 11/2003 | McElhatten et al. |
| 2003/0225777 | A1 | 12/2003 | Marsh |
| 2004/0015398 | A1 | 1/2004 | Hayward |
| 2004/0230994 | A1 | 11/2004 | Urdang et al. |
| 2005/0034171 | A1 | 2/2005 | Benya |
| 2005/0086334 | A1 | 4/2005 | Aaltonen et al. |
| 2006/0017846 | A1 * | 1/2006 | Kim ................ H04N 21/4341 348/515 |
| 2006/0168609 | A1 | 7/2006 | Chen |
| 2007/0022459 | A1 | 1/2007 | Gaebel et al. |
| 2007/0061023 | A1 | 3/2007 | Hoffberg et al. |
| 2007/0157262 | A1 | 7/2007 | Ramaswamy et al. |
| 2007/0180230 | A1 | 8/2007 | Cortez |
| 2007/0217436 | A1 | 9/2007 | Markley et al. |
| 2007/0280298 | A1 | 12/2007 | Hearn et al. |
| 2008/0170551 | A1 | 7/2008 | Zaks |
| 2008/0172287 | A1 | 7/2008 | Tien et al. |
| 2008/0306903 | A1 | 12/2008 | Larson et al. |
| 2009/0086643 | A1 | 4/2009 | Kotrla et al. |
| 2009/0133048 | A1 | 5/2009 | Gibbs et al. |
| 2009/0150917 | A1 | 6/2009 | Huffman et al. |
| 2009/0228569 | A1 * | 9/2009 | Kalmanje .......... H04N 7/17309 709/217 |
| 2010/0027560 | A1 | 2/2010 | Yang et al. |
| 2010/0115091 | A1 | 5/2010 | Park et al. |
| 2010/0122276 | A1 | 5/2010 | Chen |
| 2010/0125658 | A1 | 5/2010 | Strasters |
| 2010/0199299 | A1 * | 8/2010 | Chang ................ H04N 7/17318 725/32 |
| 2010/0218231 | A1 | 8/2010 | Frink et al. |
| 2010/0280641 | A1 | 11/2010 | Harkness et al. |
| 2010/0313225 | A1 | 12/2010 | Cholas et al. |
| 2011/0015989 | A1 | 1/2011 | Tidwell et al. |
| 2011/0016479 | A1 | 1/2011 | Tidwell et al. |
| 2011/0016482 | A1 | 1/2011 | Tidwell et al. |
| 2011/0090898 | A1 | 4/2011 | Patel et al. |
| 2011/0093900 | A1 | 4/2011 | Patel et al. |
| 2011/0099017 | A1 | 4/2011 | Ure |
| 2011/0103374 | A1 | 5/2011 | Lajoie et al. |
| 2011/0110515 | A1 | 5/2011 | Tidwell et al. |
| 2011/0178943 | A1 | 7/2011 | Motahari et al. |
| 2011/0265116 | A1 | 10/2011 | Stern et al. |
| 2011/0267952 | A1 * | 11/2011 | Ko ...................... H04L 43/0864 370/237 |
| 2011/0283311 | A1 * | 11/2011 | Luong ................. H04N 21/414 725/28 |
| 2012/0005527 | A1 | 1/2012 | Engel et al. |
| 2012/0030363 | A1 | 2/2012 | Conrad |
| 2012/0079518 | A1 * | 3/2012 | Wan ..................... H04H 60/45 725/14 |
| 2012/0124606 | A1 | 5/2012 | Tidwell et al. |

OTHER PUBLICATIONS

UTF-32, IBM, retrieved from http://publib.boulder.ibm.com/infocenter/iseries/v5r3/index.jsp?topic=%2Fnls%2Frbagsutf32.htm. on Aug. 28, 2013.

* cited by examiner

APPARATUS AND METHODS FOR IDENTIFYING AND CHARACTERIZING LATENCY IN A CONTENT DELIVERY NETWORK

PRIORITY AND RELATED APPLICATIONS

This application is a divisional of and claims priority to co-owned, U.S. patent application Ser. No. 12/944,648 filed on Nov. 11, 2010 entitled "APPARATUS AND METHODS FOR IDENTIFYING AND CHARACTERIZING LATENCY IN A CONTENT DELIVERY NETWORK", issuing as U.S. Pat. No. 8,930,979 on Jan. 6, 2015, which is incorporated herein by reference in its entirety. This application is related to co-owned, U.S. application Ser. No. 12/829,104 filed on Jul. 1, 2010 and entitled "APPARATUS AND METHODS FOR DATA COLLECTION AND VALIDATION" which was patented as U.S. Pat. No. 8,484,511 on Jul. 9, 2013, and co-owned, co-pending U.S. patent application Ser. No. 12/877,062 filed on Sep. 7, 2010 and entitled "METHODS AND APPARATUS FOR AUDIENCE DATA COLLECTION AND ANALYSIS IN A CONTENT DELIVERY NETWORK", each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related in one exemplary aspect to apparatus and methods for identifying and characterizing latency in the delivery of content and/or data to devices in the network.

2. Description of Related Technology

Several factors such as e.g., satellite latency, number of physical devices in the headend, the number of amplifiers in the RF plant, the distance of a user device such as a settop box (whether stand alone or within another user device) from the headend, the amount of signal conductor medium (e.g., fiber/coaxial cable) utilized, set top box type, etc. contribute to latency experienced when content "should" be displayed to a user, and when it is actually displayed. Generally, this latency is small (for example it may be only a few seconds). When "rating" broadcast viewing for programming content (such as via the well-known "Nielsen Ratings"), the aforementioned latency (of e.g., a few seconds) is insignificant because the programming content is generally at least 30 minutes in length. However, when rating a commercial (e.g., determining the effectiveness of a commercial, the number of quantifiable views of the commercial, etc.), which may be as short as a few seconds, these latencies become increasingly more significant and potentially problematic.

The aforementioned Nielsen Ratings are a well known system of evaluating the viewing habits of cross sections of the population. Statistical techniques are used to develop a sample population which is a cross section of a larger national population. Theoretically, the viewing habits of the sample population will mirror the larger population. Historically, the Nielsen system has been the primary source of audience measurement information in the television industry. The Nielsen system, therefore, affects various aspects of television including inter alia, advertising rates, schedules, viability of particular shows, etc. However, there are several disadvantages to the Nielsen approach, including e.g., the inability of the system to account for small measures of time (e.g., generate second-by-second viewing statistics).

A variety of entities in the content delivery system may be responsible for introducing latency, including e.g., the content source or store, the user device architecture, and the network topology.

Latency may be introduced at the user device (e.g., settop box (STB), digital settop box (DSTB), consumer premises equipment (CPE), etc.). Each user device manufacturer and software provider develops an architecture that leads necessarily to a discrete average amount of time between an acquired MPEG signal being received "on the wire" (whether wired or wireless) and decoded and sent to a television or other device for viewing. This latency is predictable and can be characterized in a lab environment. Thus, an operator may include in its internal description of a user device (e.g., STB, DSTB, CPE, etc.) a "mean signal processing time" for each model/software combination. For example, user device induced latency may be illustrated by looking at two different televisions in a subscriber's home. Suppose that one of the televisions is connected to an STB which does not have DVR capability, and the other is connected to an STB that does have DVR capability. It will be generally observed that the content being viewed on the television attached to the STB with DVR capabilities is "delayed" by some small amount of time as compared to the content being viewed on the other television. This is due to, inter alga, the DVR storage media (e.g., HDD) access time.

Plant topology is not as easily characterized as that of the user devices. Though it is possible to determine through experimentation the incremental latency incurred "per mile of coaxial cable" or "per mile of fiber" or "per amplifier", there is often no reliable way to know how many miles of fiber or number of amplifiers lie between a deployed device and the headend. Therefore, a mechanism must be devised to determine real-time the plant topology induced latency for each user device deployed in the network, which may vary from user device to user device. The latency may also be introduced through digital signal processing that occurs in the headend.

Generally, latency does not affect the quality or level of service an MSO provides from the perspective of signal quality or resolution. However, the aforementioned latency does effect interactive abilities and census level advertising consumption and interaction calculations, and may adversely impact user experience. Specifically, when an MSO wishes to offer or enable programmers to offer real-time interactive components (such as voting, t-commerce, etc.), depending on the nature of the application, the aforementioned latency may affect the quality of service a subscriber receives.

Likewise, when an MSO wishes to provide advertisers or networks a "second-by-second" view of subscriber consumption of and response to advertising content, normalizing for latency is critical for accurate representations. For example, if a user tuned away from an advertisement 5 seconds into the advertisement (in actual time, and/or from the user's perspective on the settop box), but the latency made it appear that he/she tuned away after 15 seconds (or the user's settop box may have introduced a latency of 10 seconds) then the advertiser might draw an erroneous conclusion from this data (i.e., if the advertisement duration was 15 seconds total, the advertiser might conclude that the user watched the entire advertisement, when in fact they tuned away almost immediately).

Under current (e.g., Nielsen) rating schemes, programs are credited with "views" if there is any viewing within a quarter hour. That is to say, every 15 min, under the Nielsen system, an impression is logged. However, advertisements may be as short as 15 seconds. Thus, in order to accurately account for advertising views and/or to generate meaningful second-by-second ratings, the offset in the network latency can be significant and, when significant, should be accounted for.

Therefore, what is needed are methods and apparatus able to mark impressions on a smaller scale (e.g., on the order of seconds versus minutes). In order to accredit these impressions, so that for example they may be used as a "currency", the Media Ratings Council (MRC) requires evidence that the latency is accounted for. Moreover, such methods and apparatus would also ideally be further adapted to compensate for such latency when gathering audience information in real-time in order to identify viewership actions of actual viewers.

These features would also be provided using substantially extant network infrastructure and components (thereby obviating any significant retrofit or re-engineering), and would be compatible with a number of different client device and delivery systems including both wired and wireless technologies.

SUMMARY OF THE INVENTION

The present invention addresses the foregoing needs by disclosing, inter alia, apparatus and methods for identification and characterization of, and/or compensation for, latency in a content delivery network.

In a first aspect of the invention, a method for providing data is disclosed. In one embodiment, the data relates to interaction of a client device of a content distribution network with one or more portions of content provided over the network, and the method comprises: determining a latency attributable to the device; determining a latency attributable to a path within the network which the content must take to be provided to the device; utilizing the latency attributable to the device and the latency attributable to the network path to determine a aggregate latency specific to the device; collecting data relating to interaction of the device with the one or more portions of the content; and accounting for the aggregate latency with respect to the data.

In a second aspect of the invention, a method for accounting for an asynchronization between an entity for providing content in a content delivery network and a plurality of devices for receiving the content therefrom is disclosed. In one embodiment, the asynchronization is unique for each of the plurality of devices, and the method comprises: determining values for a latency attributable to respective ones of the plurality of devices, respectively; determining values for a latency attributable to respective network paths taken for the delivery of the content to each of the plurality of devices; and for each of the plurality of devices, utilizing the latency attributable thereto, and the latency attributable to the respective one of the network paths, to determine composite latencies unique to each of the plurality of devices.

In a third aspect of the invention, a method for determining a system latency specific to an individual one of a plurality of devices in a content delivery network is disclosed. In one embodiment, the method comprises: collecting a value for latency attributable to the individual one of the plurality of devices; sending a message requiring a response to the individual one of the plurality of devices at a first time; receiving, in response to the message the response from the individual one of the plurality of devices, the response indicating a second time; and applying at least one algorithm to: determine a portion of the difference between the second and the first time attributable to a one-way traversal of the network to the individual one device; and combine the portion of the difference with the value for latency attributable to the individual one of the plurality of devices to obtain a system latency for that individual one device.

In a fourth aspect of the invention, consumer premises equipment (CPE) for use in a content delivery network is disclosed. In one embodiment, the CPE comprises: at least one first interface configured to communicate with the content delivery network; a storage apparatus; and a digital processor, a caching mechanism, the digital processor configured to run at least one computer program thereon. The program is configured to, when executed: determine a measure of time which the CPE is out of synchronization to at least one entity of the network; collect a plurality of records, each of the plurality of records indicating: a time of collection of the record; and a descriptor of an interaction of a user of the CPE with one or more content elements; and re-synchronize the collected plurality of records by adjusting the time of the collection for each of the records by the measure of time.

In a fifth aspect of the invention, a network apparatus is disclosed. In one embodiment, the apparatus is configured for determining amounts of time by which records collected by a user device must be adjusted to account for latency in a content delivery network, and comprises: at least one first interface configured to communicate at least the user device; a storage apparatus; and a digital processor, the digital processor configured to run at least one computer program thereon. The program is configured to, when executed: obtain a first value representative of processing delay at the user device; derive a second value associated with a transmission delay between the network apparatus and the user device; and utilize the first and the second values to calculate a third value, the third value representing a unique amount of time individual ones of the records collected at the user device must be adjusted.

In a sixth aspect of the invention, a method of obtaining data relating to content is disclosed. In one embodiment, the method comprises: delivering content to a plurality of users of a network; obtaining data relating to interactions of the users with the delivered content; and adjusting the data so that it accurately reflects the timing of the interactions relative to delivery of the content.

In a seventh aspect of the invention, a computer readable apparatus is disclosed. In one embodiment, the apparatus comprises a medium having at least one program stored thereon, the at least one program being configured to at least collect data relating to user interactions with content, and correct the data for any asynchronizations.

In an eighth aspect of the invention, a system for collecting and distributing data relating to user interactions with content is disclosed.

In a ninth aspect of the invention, methods of doing business relating to data describing user interactions are disclosed.

These and other aspects of the invention shall become apparent when considered in light of the disclosure provided herein.

Figure 1:
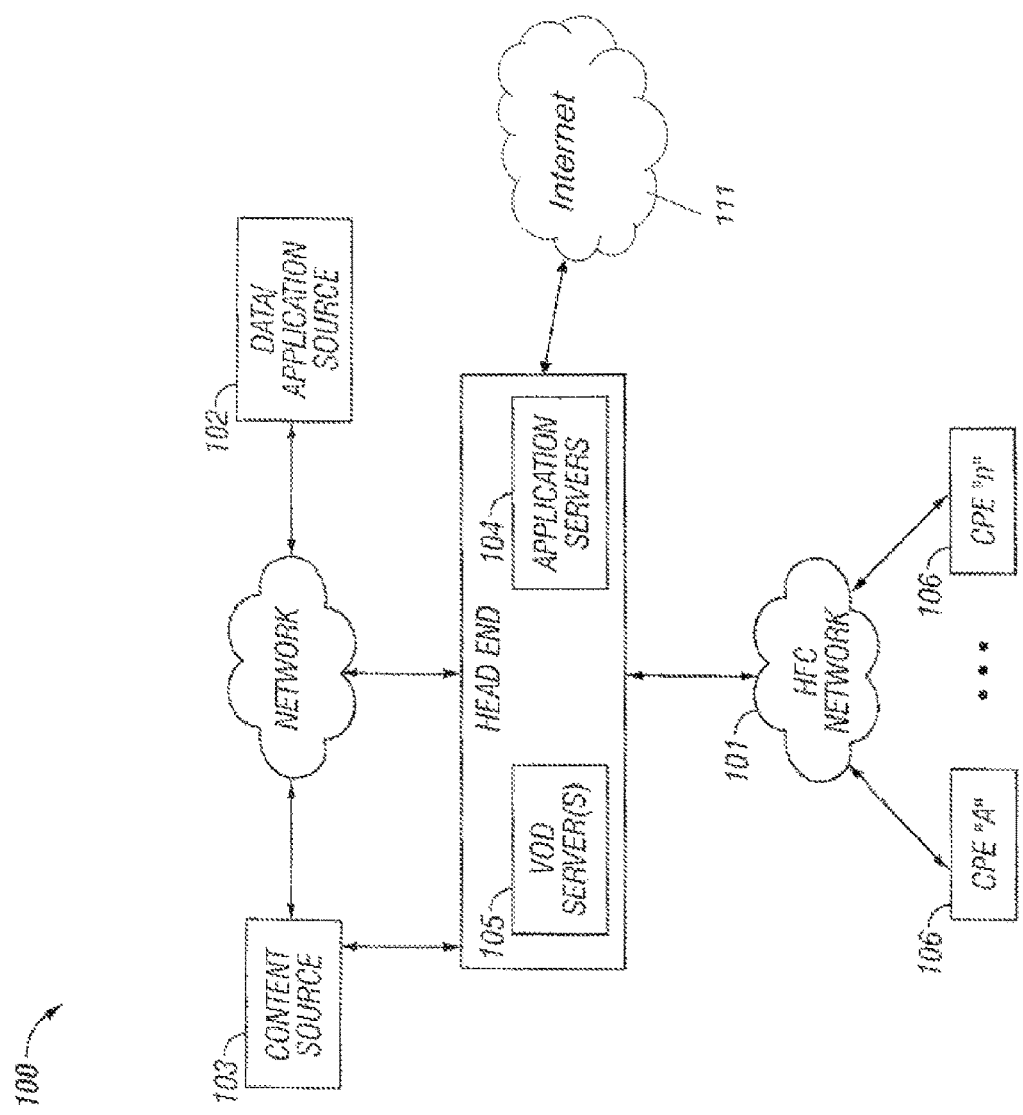
FIG. 1 is a functional block diagram illustrating an exemplary HFC cable network configuration useful with the present invention.

All Figures © Copyright 2010 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The terms "Customer Premises Equipment (CPE)" and "host device" refer without limitation to any type of electronic equipment located within a customer's or user's premises and connected to a network.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11a,b,g,n), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including 802.11 a/b/g/n/v.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

OVERVIEW

The present invention discloses, inter alia, methods and apparatus for identification and characterization of, and compensation for, latency that may be present in a content delivery network. Interaction of users with content is recorded in one embodiment via the collection of a plurality of tuning records. However, as noted above, the network entities providing content and the client devices may be out of synchronization due to latency. Hence, the architecture and methods described herein may be used to adjust the timing on the tuning records collected from the devices (e.g., "normalize" the timestamps thereof). Once normalized, these tuning records may be relied upon as being accurate representations of subscriber interaction with content on a second-by-second basis. Hence, records may be obtained for the interaction of users with content which lasts less than a minute (e.g. advertisements), and even as short as a few seconds.

In one embodiment, the amount of time which must be accounted for (i.e., the amount by which the timing of the tuning records must be adjusted) is determined by first determining a device-specific latency. The device-specific latency may be derived empirically (e.g., by experimentation) and/or calculations prior to implementing the device in the network. The device-specific latency depends on the hardware and software features of the device; hence, devices having similar hardware and software and being manufactured by the same manufacturer will have very similar if not identical device-specific latencies. The device-specific latency is added to the latency inflicted by the network during transmission of data therein from the source to the premises. In one variant, the network latency is determined by sending an example or test message to the device from the network requesting a current system time (or other response). The time expended for a single (one-way) trip between these entities is in one variant derived by taking half of the difference in time between when the message was sent and the time the response is received by the issuing entity (i.e., the round-trip time). In another variant, the latency is determined by examining a time-stamped response message, the time stamp indicating when the test message was received at the destination (e.g., CPE). Under the various models, the determination of the system latency may be made at the device itself, and/or at the network entity.

Exemplary implementations of the invention also obtain audience information records (e.g., tuning records) directly from customer's premises equipment (i.e., set top boxes, cable modems, PCs, PMDs, IP devices, etc.), for each individual device, or even on a per-user basis where possible, thereby allowing a content provider or other analytical entity to gather specific information in large quantities across a broad geographical area, or demographic/psychographic slice. The information collected may include information relating to e.g., the user's interaction with content, such as tuning in, tuning out, tuning away, trick mode operations, etc. Advantageously, multiple sources of content to which viewership behavior relates can be simultaneously monitored, and subscriber anonymity or privacy maintained (i.e., no use is made of personally identifiable information). The aforementioned latency value is then reflected in the tuning records, so that each accurately represents the time at which the information is obtained.

Business models and rules for the implementation of the aforementioned methods and for the identification, characterization and application of latency to data relating to a user's interaction with content are also described.

DETAILED DESCRIPTION OF EXEMPLARY EMBODIMENTS

Exemplary embodiments of the apparatus and methods of the present invention are now described in detail. While these exemplary embodiments are described in the context of use with the aforementioned hybrid fiber (e.g., HFC) terrestrial delivery system or satellite network architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature. For instance, the invention may be adapted for use on so-called hybrid fiber copper (HFCu) networks, or WiMAX (IEEE Std. 802.16) wireless networks.

It will also be appreciated that while described generally in the context of a consumer (i.e., home) end user domain, the present invention may be readily adapted to other types of environments (e.g., commercial/enterprise, government/ military, etc.) as well. Myriad other applications are possible.

Other features and advantages of the present invention will immediately be recognized by persons of ordinary skill in the art with reference to the attached drawings and detailed description of exemplary embodiments as given below.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. The headend is also connected through a gateway or other such interface (not shown) to unmanaged external internetworks such as the Internet 111. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the architecture of FIGS. 1a-1c (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Although not illustrated, a typical network headend 150 may further include e.g., various billing entities, subscriber management systems, cable modem termination system (CMTS)

It will also be appreciated that the network configuration depicted in FIG. 1 is high-level, conceptual architecture and that each MSO may have multiple headends deployed using custom architectures.

The exemplary headend 150 may further include a multiplexer-encrypter-modulator (MEM) adapted to process or condition content for transmission over the network. As previously described, information is carried across multiple channels. Thus, the headend 150 must be adapted to acquire the information for the carried channels from various sources. Typically, the channels being delivered from the headend 150 to the CPE 106 ("downstream") are multiplexed together in the headend, as previously described and sent to neighborhood hubs (FIG. 1b) via a variety of interposed network components.

It will also be recognized, however, that the multiplexing operation(s) need not necessarily occur at the headend 150 (e.g., in the aforementioned MEM). As one alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1A:
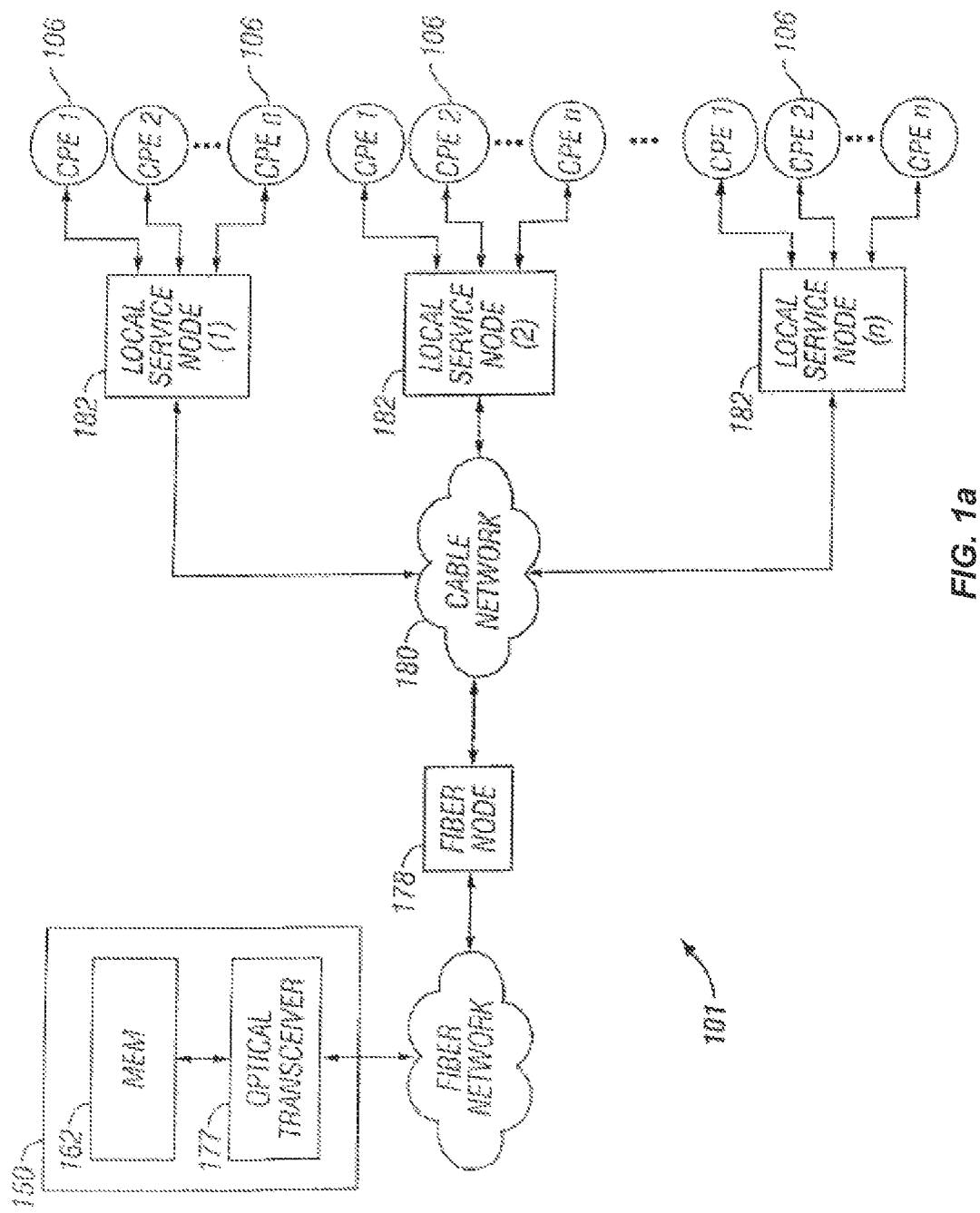
FIG. 1a is a functional block diagram illustrating one exemplary local service node configuration useful with the present invention.

In addition to on-demand and broadcast content (e.g., video programming), the system of FIGS. 1 and 1a (and 1b and 1c discussed below) also deliver Internet 111 data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels, such as via a multiplexed transport stream (MPTS). In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs, such as described below with respect to FIG. 1c.

The CPE 106 are each configured to monitor the particular assigned RF channel (such as via a port or socket ID/address, or other such mechanism) for IP packets intended for the subscriber premises/address that they serve.

"Switched" Networks—

Figure 1B:
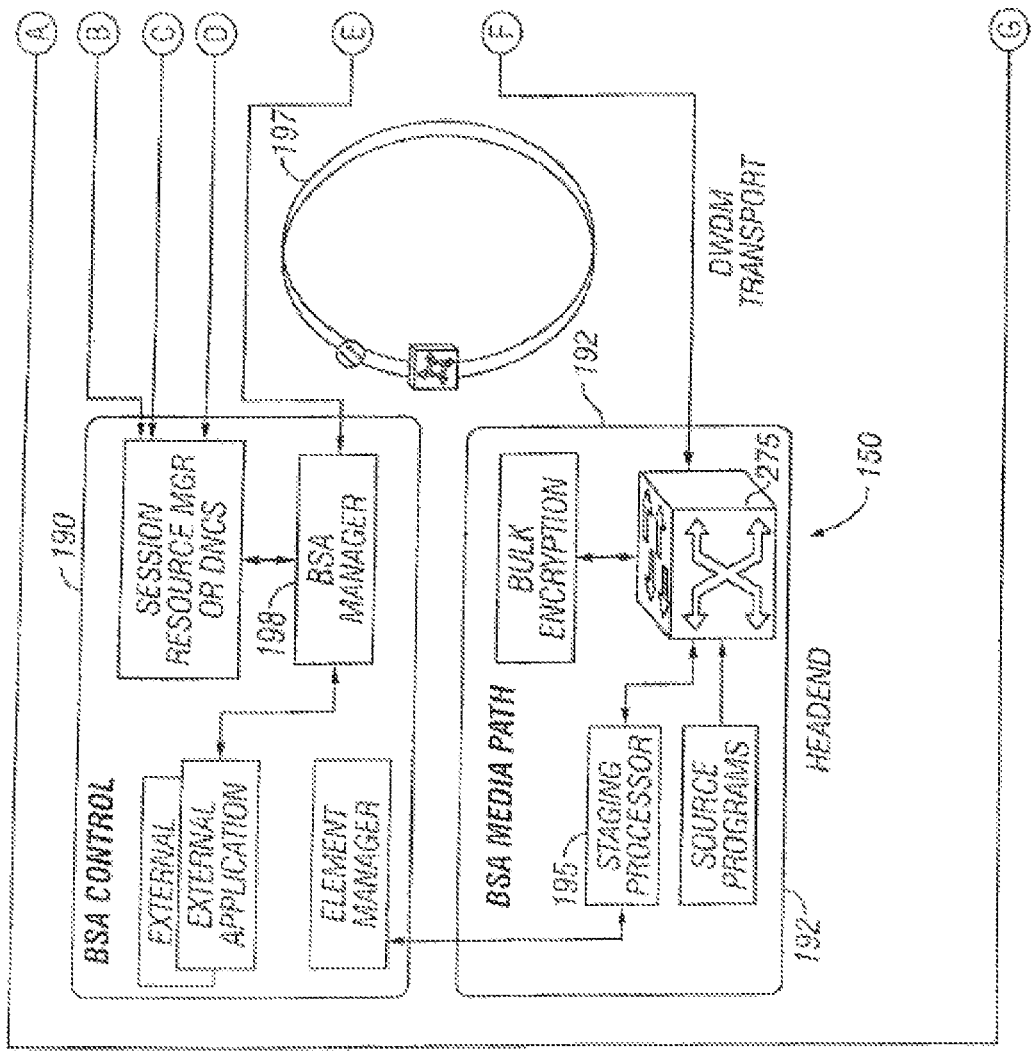
FIG. 1b is a functional block diagram illustrating one exemplary broadcast switched architecture (BSA) network useful with the present invention.
Figure 1B:
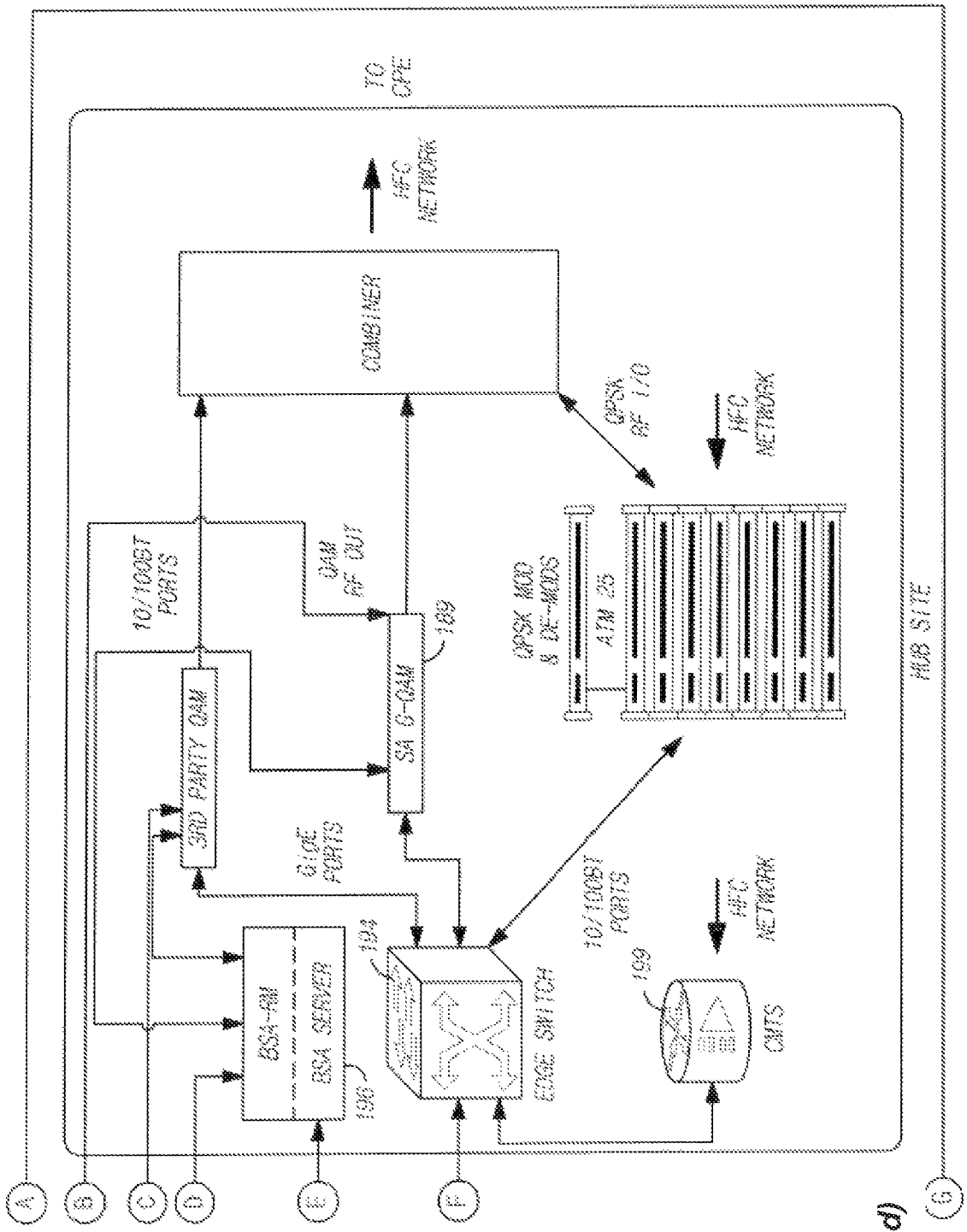

FIG. 1b illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1b shows the implementation details of one exemplary embodiment of this broadcast switched network architecture. Specifically, the headend 150 contains switched broadcast control and media path functions 190, 192, these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique For Effectively Providing Program Material In A Cable Television System", incorporated herein by reference in its entirety, describes one exemplary broadcast switched digital architecture useful with the present invention, although it will be recognized by those of ordinary skill that other approaches and architectures may be substituted.

Referring again to FIG. 1b, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1C:
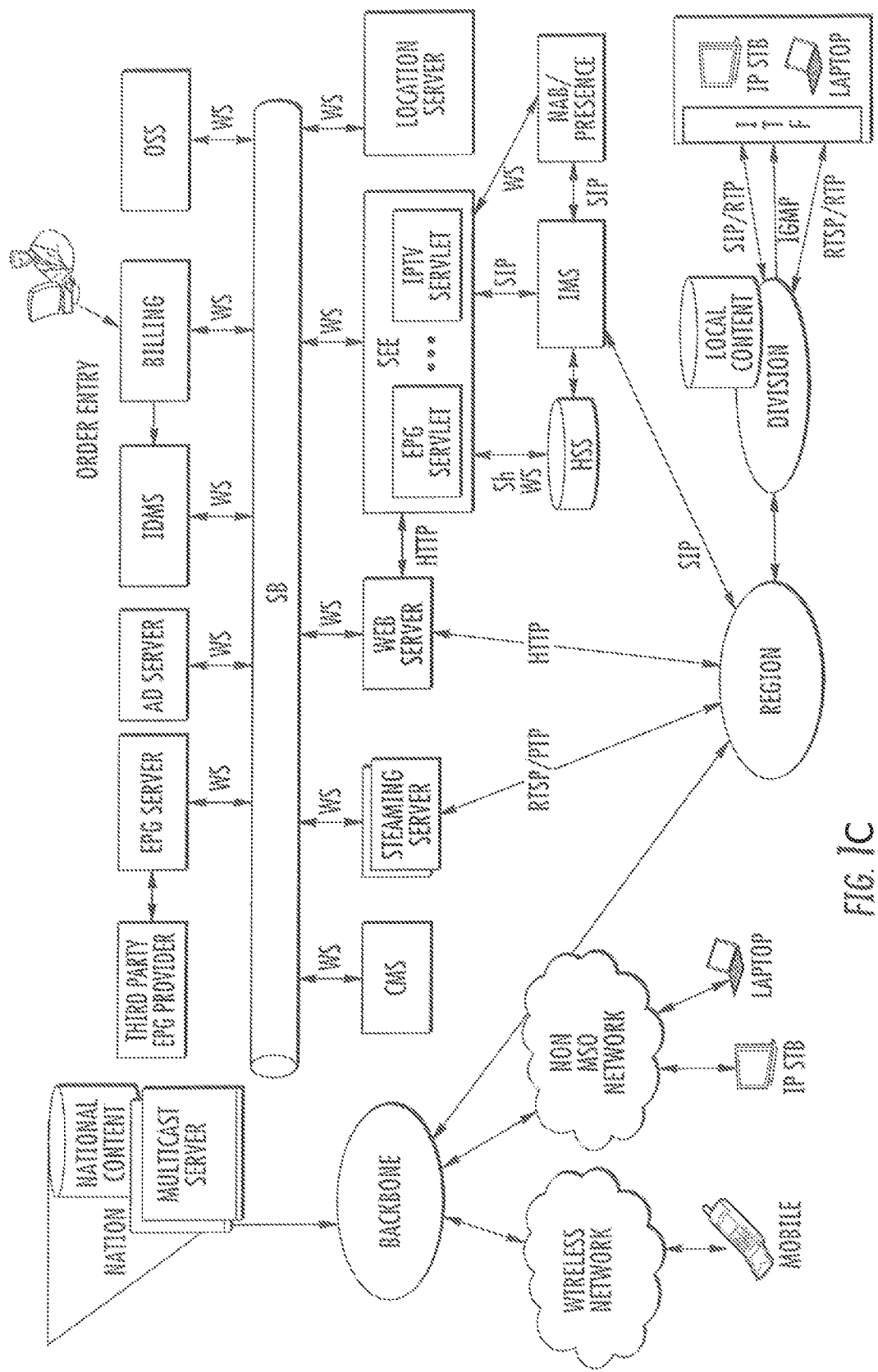
FIG. 1c is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content) when the request issues from an MSO network (see discussion of FIG. 2a below). FIG. 1c illustrates one exemplary implementation of such a network, in the context of an IMS (IP Multimedia Subsystem) network with common control plane and service delivery platform (SDP), as described in co-pending U.S. Provisional Patent Application Ser. No. 61/256,903 entitled "METHODS AND APPARATUS FOR PACKETIZED CONTENT DELIVERY OVER A CONTENT DELIVERY NETWORK", incorporated herein by reference in its entirety. Such a network provides significant enhancements in terms of common control of different services, implementation and management of content delivery sessions according to unicast or multicast models, quality-of-service (QoS) for IP-packetized content streams, service blending and "mashup", etc.; however, it is appreciated that the various features of the present invention are in no way limited to any of the foregoing architectures.

Latency Identification and Characterization Architecture—

Figure 2A:
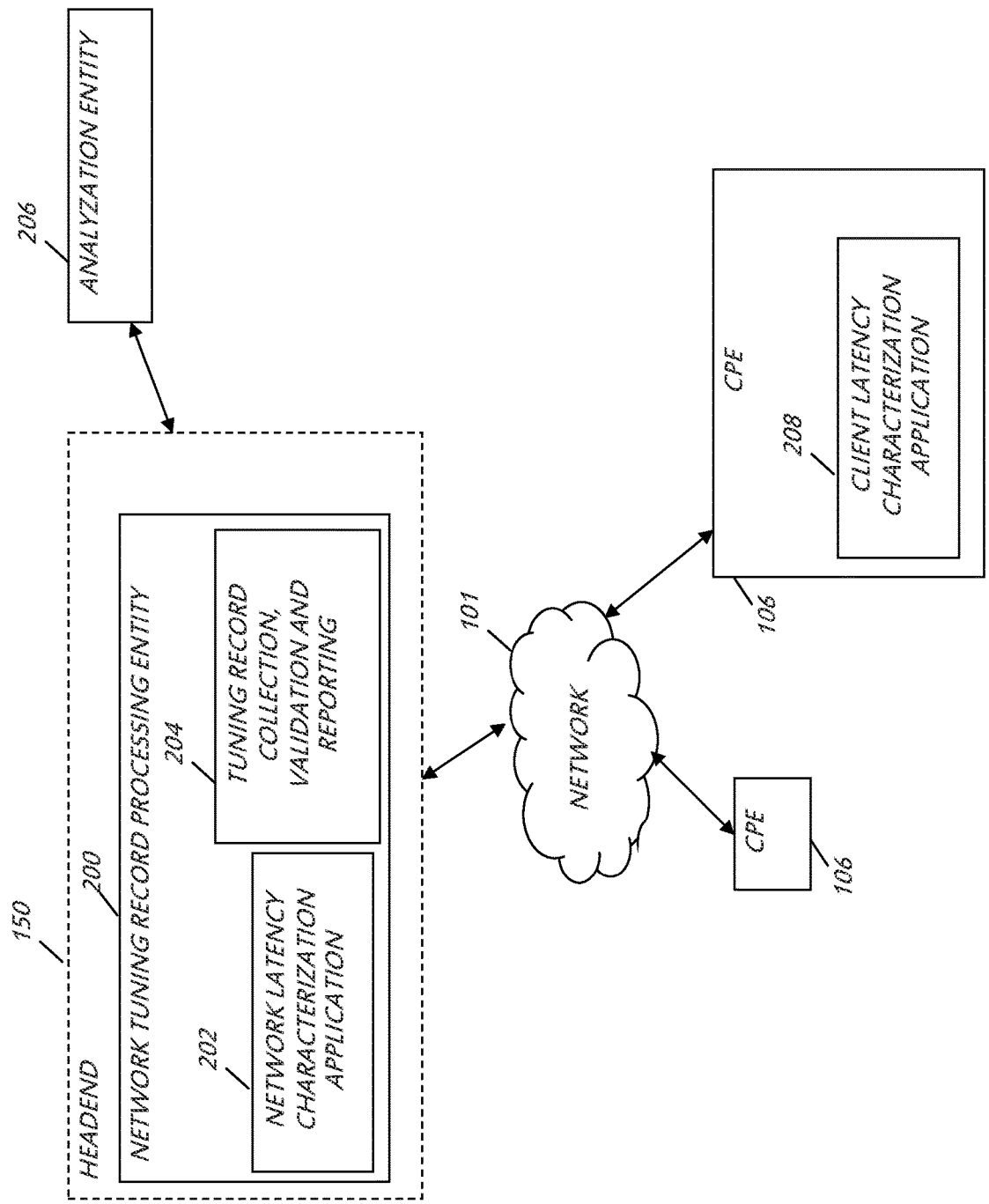
FIG. 2a is a functional block diagram illustrating a first embodiment of a latency identification and characterization architecture configured in accordance with the present invention.

Referring now to FIG. 2a, a high-level block diagram of a latency identification and characterization architecture configured in accordance with one embodiment of the invention is illustrated.

The architecture of FIG. 2a generally provides a mechanism whereby latency introduced by the device and by the network (or path which data must travel to reach the device) is identified, characterized and accounted for during the collection and reporting of tuning records. As used herein, tuning records refer to without limitation a collection of data files, each file containing information regarding a subscriber's usage and interaction with content and/or data. The architecture illustrated in FIG. 2a generally comprises a network headend 150, including a network tuning record processing entity 200.

The tuning record processing entity 200 is in communication with a plurality of user devices or customer premises equipment (CPE) 106, which may include, inter alia, personal media devices (PMDs), laptop and personal computers (PCs), set top boxes (STBs), digital video recorders (DVRs), etc., via the network 101. As illustrated, each of the CPE 106 comprises in one embodiment a client latency characterization application 208 running thereon, which will be described in greater detail below. Alternatively, the CPE 106 may comprise a legacy or OEM device which merely can time-stamp received messages or packets as to when they are received.

The CPE 106 in one embodiment comprises a gateway device such as that discussed in co-owned, co-pending U.S. patent application Ser. No. 11/818,236 filed Jun. 13, 2007 and entitled "PREMISES GATEWAY APPARATUS AND METHODS FOR USE IN A CONTENT-BASED NETWORK", which is incorporated herein by reference in its entirety. As discussed therein, the gateway acts as a unified proxy for all inbound (downstream) and outbound (upstream) communications with a network. In this way, various user devices within a premises may receive data and content via the gateway apparatus.

The network tuning record processing entity 200 is configured to run at least a network latency characterization application 202 process and a tuning record collection, validation and reporting 204 process thereon. Although illustrated and described as comprising software running on a processor of the tuning record processing entity 200 (e.g., a server), it is appreciated that these processes 202, 204 may alternatively take the form of a hardware device or logic, combination of hardware and software, or any other form suitable to achieve the desired degree of automation and processing. Likewise, one or more of the aforementioned processes 202, 204 may be located at a different entity, whether at the headend 150 or elsewhere. It is further appreciated that the tuning record processing entity 200 may be physically located at any other location whether within the network 101 or in a separate network (not shown) in communication therewith.

Content and data are provided to the CPE 106 from the network 101. In one embodiment, content and/or data are provided to the CPE 106 using e.g., a Moving Picture Experts Group (MPEG) transport stream. The MPEG protocol uses Program and System Information Protocol (PSIP) to deliver content, as discussed in "ADVANCED TELEVISION SYSTEMS COMMITTEE (ATSC) STANDARD: PROGRAM AND SYSTEM INFORMATION PROTOCOL FOR TERRESTRIAL BROADCAST AND CABLE (PSIP)", Document A/65; published Apr. 14, 2009 and incorporated herein by reference in its entirety. Since PSIP has to propagate through all the wiring, equipment, interfaces, etc. in order to deliver content and/or data to the individual devices, latency is introduced. Hence, a method is utilized in the present invention to identify and characterize this latency (see e.g., FIGS. 3-3*b*). As discussed below with respect to FIG. 4, once the latency for the overall system is identified and characterized, tuning records may be obtained from the devices (or alternatively, the records can be obtained in advance or contemporaneous with the latency characterization, and then be processed subsequently).

As discussed in greater detail below with respect to FIGS. 4 and 5, the tuning records are processed to take into account the latency so as to accurately reflect viewing statistics in a second-by-second manner. Tuning records may be collected and analyzed across an entire MSO footprint, or only in selected subsets or portions thereof. That is to say, every viewer action on every device may be monitored and analyzed second-by-second if desired, or smaller "slices" taken. This information may advantageously be utilized to among other things, accurately determine viewership including during commercials or advertisements, and/or to recognize the reactions of viewers to certain portions (e.g., vignettes, images, storylines, characters, etc.), since the level of timing precision afforded by the present invention is so high.

Latency for the system is determined in one embodiment via the network latency characterization application 202 and the client latency characterization application 208. This latency is applied to the data regarding activity taken with respect to content on the user devices (i.e., tuning records). In other words, the tuning records are normalized (to account for the latency). The normalized records are then validated, and in some cases analyzed at the network tuning record processing entity 200, before being reported out or packaged for subsequent consumption. The processed tuning records (having been normalized, validated and optionally analyzed) are reported to an analyzation entity 206. In the illustrated embodiment, the analyzation entity 206 is located outside of the MSO network 101 of FIG. 1; however, it is appreciated that the analyzation entity 206 may be physically located literally anywhere including e.g., remote to the network 101, at a different or non-MSO network, and/or within the illustrated network 101. The analyzation entity 206 may also be associated with a particular content provider or advertiser, or alternatively unaffiliated or acting on behalf of multiple parties.

The tuning records utilized in the exemplary embodiment of the invention may comprise a plurality of types of data. For example, records may be collected relating to: (i) requests to receive specific content elements (e.g., movie, game, etc.) at particular devices such as CPE 106, PMD, etc. (e.g., "tune in" events), (ii) the number of times the content element is requested, (iii) other events or functions such as "trick mode" operations employed with respect to content including e.g., fast forward, rewind, pause, play, etc., (iv) requests to terminate viewing of specific content elements (e.g., "tune away" events), (v) requests to terminate viewing altogether (e.g., "tune out" events), etc. This data may be analyzed with respect to the requesting devices, including e.g., the frequency of fast forward requests during certain types of programming, the subscriber associated to the device, group of subscribers, devices, households, geographic or demographic areas, etc.

Analyzation of the data, such as at the tuning record processing entity 200 and/or at the analyzation entity 206, may be utilized to generate reports. For example, these reports may relate to the number of requests by one or more subscribers, devices, households, geographic zones, demographics, etc. or over a particular time period. In this way, second-by-second data regarding a plurality of users' interaction with content, which would generally tend to be too voluminous and detailed to be useful, may be accredited and summarized to produce useful data. In one embodiment, the methods and apparatus of the previously incorporated U.S. application Ser. No. 12/829,104 entitled "APPARATUS AND METHODS FOR DATA COLLECTION AND VALIDATION" are utilized for analyzing the collected and normalized tuning records, although it will be appreciated that other approaches may be used with equal success consistent with the present invention.

The analyzed data, may also be utilized to support any number of business models including e.g., to make business or operational decisions, make programming or advertising selection decisions "on the fly", etc., as discussed below with respect to the Business/Operational Rules Engine section hereof.

The tuning records (i.e., data regarding the user's interaction with content) may include interaction with various different types or delivery modes of content. For example, data may be collected regarding the users interaction with linear and/or switched digital broadcast content, VOD/MVOD/FVOD (or other type of on-demand content), content from a personal video recorder (PVR) or digital video recorder (DVR), whether local to the premises or network-based, IPTV content, etc. Further, the requested/provided content may comprise, for example, so called "quick clips" content (described in co-owned U.S. Pat. No. 7,174,126 issued Feb. 6, 2007 and entitled "TECHNIQUE FOR EFFECTIVELY ACCESSING PROGRAMMING LISTING INFORMATION TN AN ENTERTAINMENT DELIVERY SYSTEM" incorporated herein by reference in its entirety), so-called "start-over" content (described in co-owned, co-pending U.S. Patent Publication No. 2005/0034171 entitled "TECHNIQUE FOR DELIVERING PROGRAMMING CONTENT BASED ON A MODIFIED NETWORK PERSONAL VIDEO RECORDER SERVICE" incorporated herein by reference in its entirety), so-called "lookback" content (as described in co-owned, co-pending U.S. patent application Ser. No. 10/913,064 filed Aug. 6, 2004 and entitled "TECHNIQUE FOR DELIVERING PROGRAMMING CONTENT BASED ON A MODIFIED NETWORK PERSONAL VIDEO RECORDER SERVICE" incorporated herein by reference in its entirety), and/or so-called "remote DVR" content (as discussed in co-owned U.S. Pat. No. 7,457,520 issued Nov. 25, 2008 and entitled "TECHNIQUE FOR PROVIDING A VIRTUAL DIGITAL VIDEO RECORDER SERVICE THROUGH A COMMUNICATIONS NETWORK" incorporated herein by reference in its entirety).

Still further, enhanced access to premium content which is not available to non-subscribers or which cannot be delivered across traditional transport may also be provided, such as e.g., behind the scenes outtakes, alternate endings, actor interviews, etc. and data collected relating thereto as well. In yet a further embodiment, the content may comprise interactive content such as that described in co-owned, co-pending U.S. patent application Ser. No. 12/582,619 filed Oct. 20, 2009 and entitled "GATEWAY APPARATUS AND METHODS FOR DIGITAL CONTENT DELIVERY IN A NETWORK", and in co-owned co-pending U.S. patent application Ser. No. 12/582,653 filed Oct. 20, 2009 and entitled "METHODS AND APPARATUS FOR ENABLING MEDIA FUNCTIONALITY IN A CONTENT-BASED NETWORK", each of which is incorporated herein by reference in its entirety.

Figure 2B:
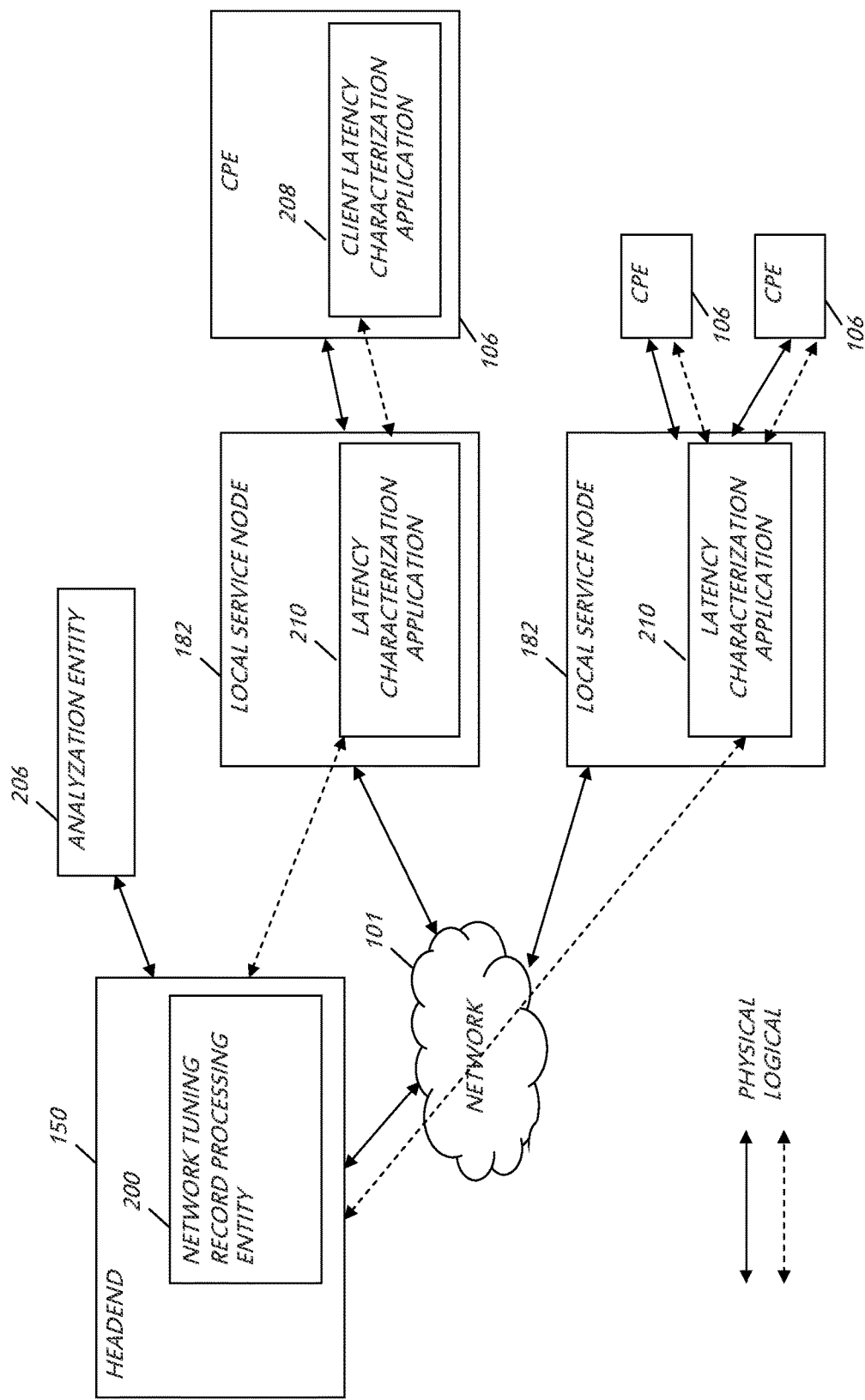
FIG. 2b is a functional block diagram illustrating a second embodiment of a latency identification and characterization architecture configured in accordance with the present invention.

Referring now to FIG. 2b, another embodiment of a latency identification and characterization architecture according to the invention is shown. In the embodiment of FIG. 2b, one or more functions of the network tuning record processing entity 200 may be placed further towards or even at the "edge" of the network. An edge latency characterization application 210 is utilized to perform the latency identification and characterization functions described herein, which were previously discussed as being performed at the network tuning record processing entity 200. The edge latency characterization application 210 is utilized in one embodiment in conjunction with the client latency characterization application 208 to determine a system latency for each CPE 106.

In the illustrated embodiment, the remaining functions (e.g., collection validation and reporting) are performed at the network tuning record processing entity 200, as in the architecture of FIG. 2a. However, it is appreciated that these and other functions may be performed at the service node 182 as well.

In another embodiment, rather than comprising separate entities, the functionality or processes of the network tuning record processing entity 200 are implemented as a series of distributed application portions located across various entities in the network.

Figure 2C:
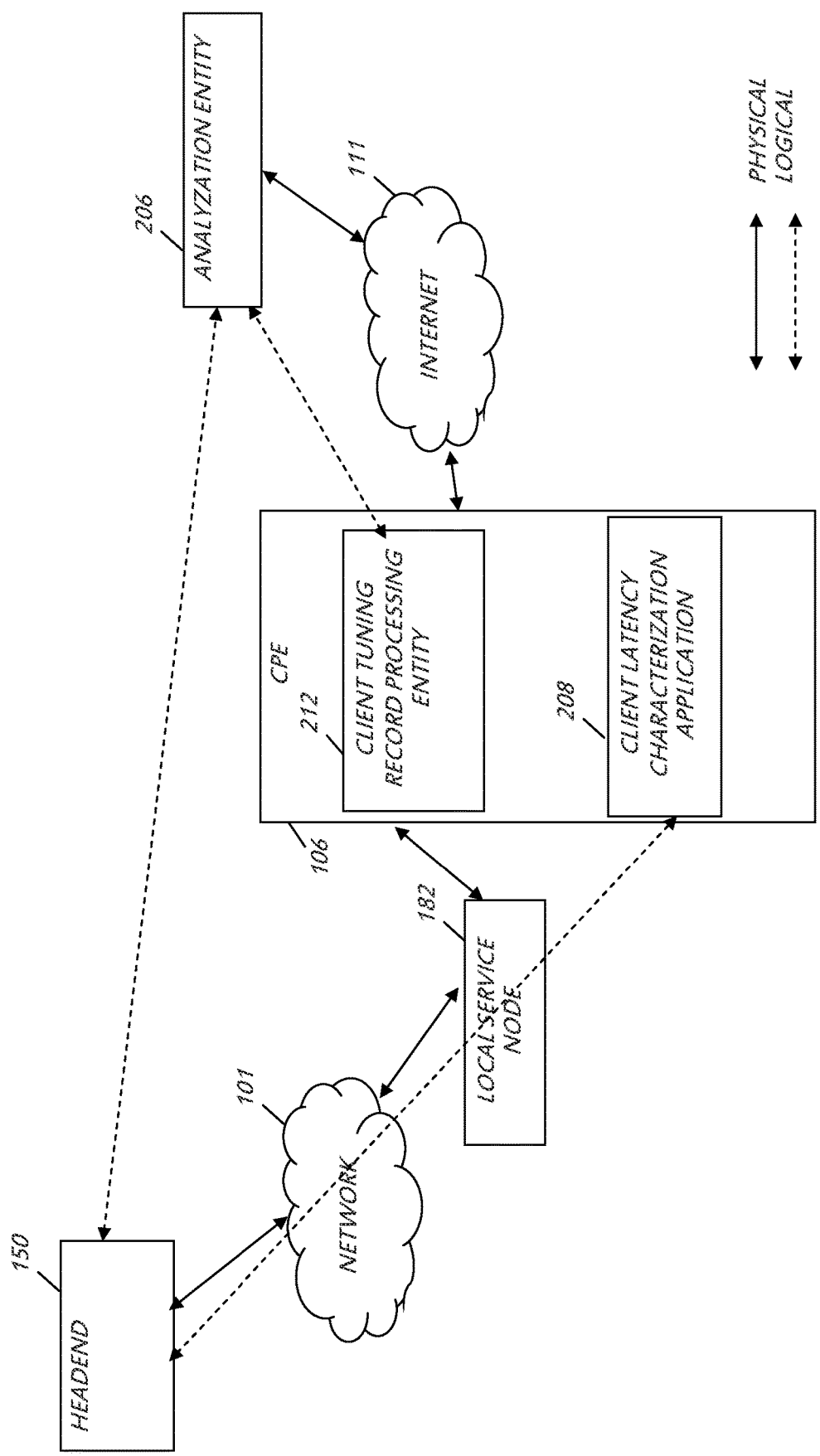
FIG. 2c is a functional block diagram illustrating a third embodiment of a latency identification and characterization architecture configured in accordance with the present invention.

FIG. 2c illustrates yet another embodiment of an architecture for latency identification and characterization according to the present invention. In this embodiment, the user device (such as e.g., CPE 106, PMD, STB, etc.) is configured to include a client tuning record processing entity 212 as well as the aforementioned client latency characterization application. Hence, according to this implementation, it is the CPE 106 itself which determines system latency and collects, validates and reports tuning records to an analyzation entity 206 or other designated processing entity.

FIG. 2c further illustrates that in this embodiment, the CPE 106 is in communication with the analyzation entity 206 via the Internet 111. The CPE 106 reports the processed (e.g., normalized, validated and optionally pre-analyzed) tuning records to the analyzation entity 206 via the Internet 111. However, it is appreciated that communication of the processed tuning records to the analyzation entity 206 may alternatively be accomplished via a headend intermediary or gateway, or yet other means such as a broadband communication channel.

The communication between the CPE 106 and the analyzation entity 206 occurs via any number of different modes such as e.g., via IP packets carried over the Internet 111 (as illustrated). In one implementation, this communication "piggybacks" or extends an existing protocol for the transmission of data such as FTP or UDP, although a dedicated protocol specifically for this purpose may be used as well. The user devices communicate data to and from the Internet via literally any wired (e.g., Ethernet, DSL, cable, fiber, and optical wireline connections) or wireless (e.g., Wi-Fi, WiMAX, WAN, PAN, MAN) networking standard.

The embodiment of FIG. 2c may be useful, for example, in a network where there is not two-way communication between the content delivery network (e.g., headend 150) and the user devices (e.g., CPE 106, PMD, etc.). In this embodiment, content is delivered via the aforementioned delivery network, while the processed tuning records (accounting for system latency) are collected and transmitted via e.g., a so-called "over the top" IP backhaul to the analyzation entity 206. Alternatively, broadband, DSL, or dial-up backhauls from the target premises may be utilized to transmit tuning or other useful information to an analyzation entity 206 (e.g., a third party website). The data may be transmitted directly to an entity associated with the content delivery network or operator (e.g., MSO) rather than a third party, and/or the analyzation entity 206 may communicate the information back to the MSO headend. The analyzation entity 206 collects the processed tuning records and analyzes them, or may send the data back to the MSO (or store the data first, and sends it up to the MSO at a later time).

It will be recognized that while the architectures of FIGS. 2a-2c are generally constructed so as to determine latency on a per-device basis (i.e., treat each CPE as having its own unique "composite" latency introduced by the network, and the device itself), the present invention can also use a less granular approach by (i) aggregating devices within common portions of a network within a common network latency "class", and/or (ii) assuming common device latencies for different CPE. This is especially true when the increased level of granularity or precision afforded by a per-device approach provides diminishing returns in terms of benefit to the MSO or content source. For instance, where a content segment (e.g., advertisement) has no salient events of interest within the first ten seconds, it may be determined that a granularity or accuracy of one or two seconds is not required, and adds no useful information (i.e., knowing what the viewer did or how they reacted in the first few seconds is of little value). Hence, in such cases, the latency data for several CPE can be e.g., categorized into ranges such that any CPE having a latency between zero (0) seconds and X seconds comprise a first category, from X to Y a second category, and so forth. For example, if it is known that all CPE within a given service group have a network latency within a given range, then they can simply be lumped together into a single class, with the variations of each individual CPE being immaterial. It may also be the case that the device-related latency is insignificant as compared to the network-induced latency (or vice versa), in which case the total latency can be approximated by the dominant network or device-related latency, with the other latency being ignored.

The foregoing aggregation approaches simplify processing and obviate having to flood the network with messages relating to events; rather, a limited number of CPE within that group can be sampled and the results extrapolated to all, or relevant statistics applied (e.g., calculation of a mean, median, variance, etc.). Hence, while the present invention can literally provide second-by-second information across the entire subscriber pool, it can also advantageously be scaled and/or statistically implemented where the aforementioned level of precision and/or subscriber coverage is not required.

Latency Identification and Characterization Methodology—

Figure 3:
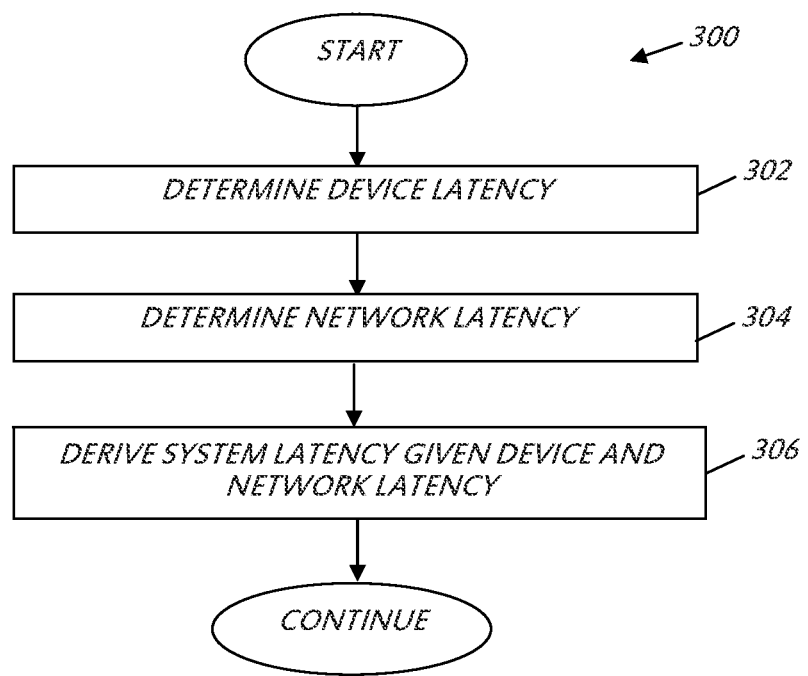
FIG. 3 is a logical flow diagram illustrating an exemplary embodiment of the generalized method for identifying and characterizing latency according to the present invention.

FIG. 3 illustrates an exemplary embodiment of the general methodology for latency identification and characterization according to the invention. It will be recognized that the steps shown in the embodiment of FIG. 3 are high-level logical steps applicable to literally any network architecture, such as discussed above in FIGS. 2a-2c, and are not intended to require or imply any specific process flow that may occur within particular implementations of the method. In practical embodiments, some of these steps (or sub-steps within each step) may be implemented in parallel, on different hardware platforms or software environments, performed iteratively, performed in a permuted order, and so forth.

As shown, per step 302, the latency of the device is first determined. In one embodiment, the device latency is experimentally or computationally determined, such as by a device manufacturer or by one or more MSO entities prior to the use of the device by the subscriber. As noted above, devices may also be aggregated into classes that fall within a certain range of latencies if such approximation is desired/tolerable.

Inherent latency in a user device (such as e.g., CPE 106) is based on the software, hardware, etc. components of the device. This may also include latency introduced by remote control units and the like used to control the CPE 106. However, the contribution of the remote control unit (or other controlling device) may be minimal. For example, if latency for a given event is about 2.8 seconds, 0.1-0.2 seconds of that latency may be attributable to the remote control. For example, DVR capabilities of a user device will affect the latency of the device. Hence, latency of a device is particular to the device type, manufacturer, and hardware/software options.

Next, at step 304, the network latency is determined. The network latency refers to the time necessary for the transmission of content and/or data from the headend to a particular device. The network latency is different for each device in the network, because a particular path which the content and/or data must take to arrive at each particular device is unique. As discussed in detail below with respect to FIGS. 3a and 3b, various methods may be utilized to determine the latency of the network.

Lastly, at step 306, an overall system latency is derived from at least the previously determined device and network latencies. The overall system latency takes into account the particular or unique path which data and/or content may take to reach a certain device, as well as the characteristics of the particular device (e.g., hardware and software options). In one embodiment, the overall system latency represents the combination (e.g., addition) of the determined device latency and the determined network latency.

Figure 3A:
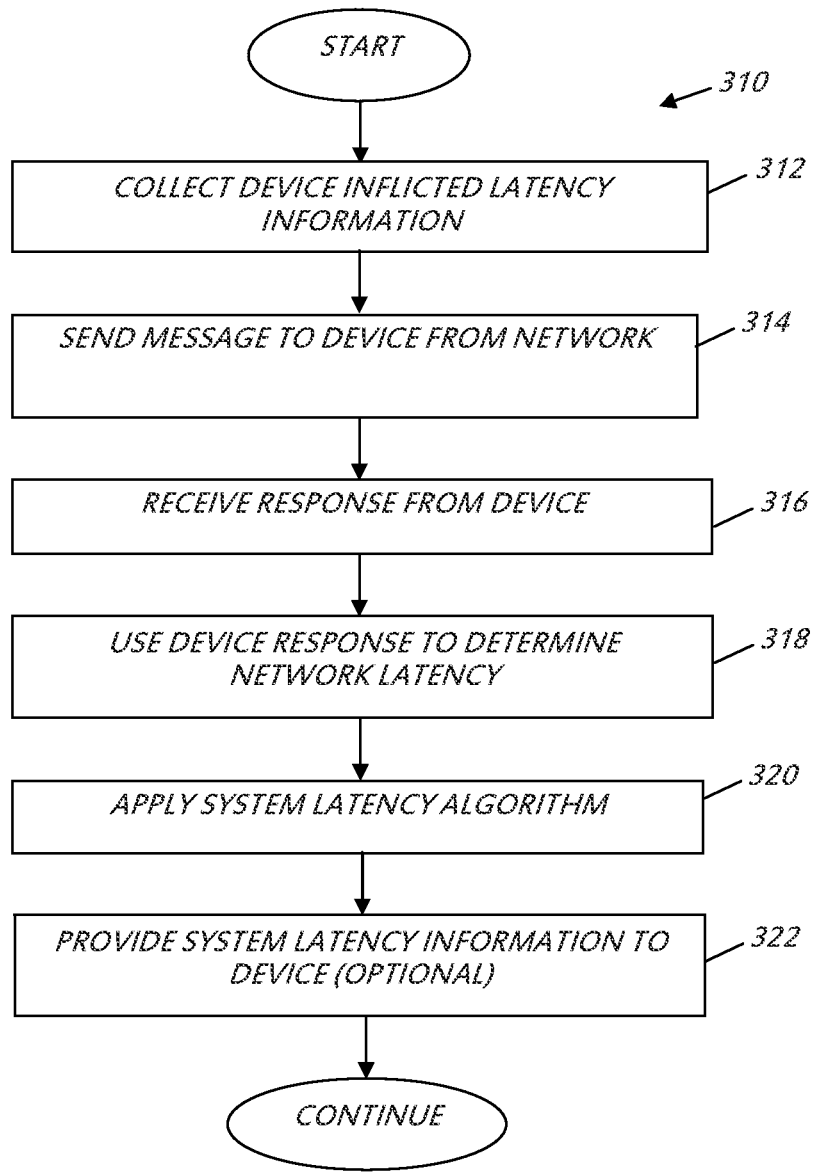
FIG. 3a is a logical flow diagram illustrating one implementation of the generalized method of FIG. 3.
Figure 3B:
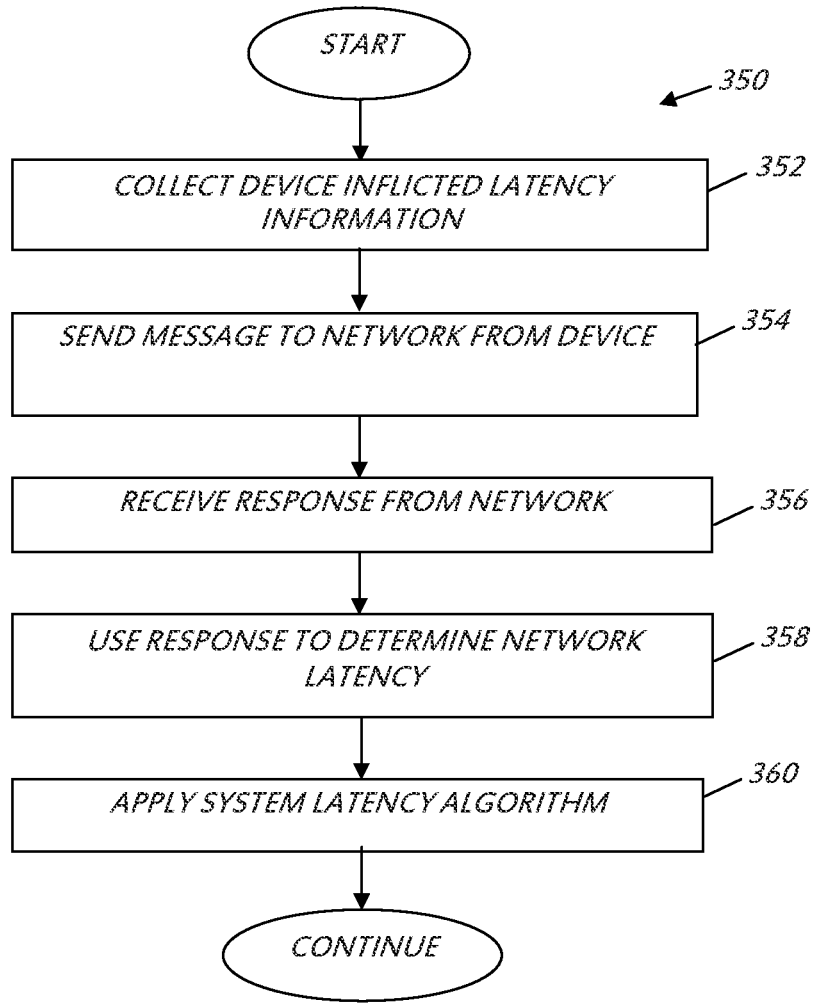
FIG. 3b is a logical flow diagram illustrating a second implementation of the generalized method of FIG. 3.

FIGS. 3a and 3b illustrate exemplary specific implementations of the generalized method discussed above, which may be utilized to derive the overall system latency. These implementations are merely illustrative, and should not be considered limiting on the broader invention.

Referring now to FIG. 3a, a first example method for latency identification and characterization is illustrated. At step 312 of this method, information regarding the device-related latency is collected. In one embodiment, this information is retrieved from a data store at e.g., the network headend 150. The aforementioned data store may be pre-populated. For example, when a user registers a particular device, information regarding that device, including latency information, may be obtained from the device itself (such as in response to a query). Alternatively, a manufacturer may provide latency information to the network 101, such as via a device profile. During device registration (and/or at the time a request for content is received), a simple look-up of the device type is performed in order to access the profile and determine the necessary device latency information. If latency information is not known about a particular device, the network may use what is known about the device (such as e.g., manufacturer, model, etc.) to request latency information from a third party entity, such as the manufacturer. In a still further embodiment, the device may be configured to, once it is installed in a home or registered to a user, transmit upstream information regarding its inherent latency, which may also change dynamically as a function of operating condition or mode. For example, a tune-away event invoked via front panel controls on a CPE may have a different latency than that invoked via remote.

Next, per step 314, a message is sent to the device from the network. The message sent at e.g., step 314 comprises in one embodiment a message requiring an answer from the device. At step 316, a response to the message is received. In one exemplary embodiment, the message comprises a Simple Network Management Protocol (SNMP) "System Time" message as discussed in the previously incorporated "ATSC STANDARD: PROGRAM AND SYSTEM INFORMATION PROTOCOL FOR TERRESTRIAL BROADCAST AND CABLE (PSIP)", Document A/65; published Apr. 14, 2009. The System Time message requests a response from the device indicating the precise time at which the message is received at that device. Hence, in response to receiving the System Time message, the device reports back (in a response message) the precise time at which it received the System Time request. Per International Organization for Standardization (ISO)/International Electrotechnical Commission (IEC) standard entitled "INFORMATION TECHNOLOGY—GENERIC CODING OF MOVING PICTURES AND ASSOCIATED AUDIO INFORMATION: SYSTEMS", document number ISO/IEC 13818-1, second edition published Dec. 1, 2010 the System Time is broadcast from the headend 150 once every second. According to the previously referenced standard, the System Time is provided in the transport stream, hence the System Time message accurately reflects the latency induced through plant topology as discussed above, and advantageously requires no new protocols or infrastructure to support its transmission.

It is appreciated however that alternative types of messages may be utilized, the foregoing SNMP System Time message being merely illustrative. For example, literally any message requiring a response from the device may be sent from the headend at step 314, provided the response is structured to include information regarding the system time when the message was received (at the device).

Other embodiments may use a "round trip" timing model to determine latency, without the need for a message format that embeds a system time of receipt therein. For instance, if the time of transmission is known by the network (transmitting entity), and the time of receipt at that same entity of an ACK or other responsive transmission is also known, the round trip delay can be readily determined, with the one-way latency being given by Eqn. (1):

$$\text{Latency(one way)} = (\text{Round trip delay}/2) - \text{processing delay} \qquad \text{Eqn. (1)}$$

Processing delay can be determined similar to that described above by, e.g., knowledge of the type of CPE receiving the test message, and its characteristic response. Moreover, a statistical or averaging approach can be utilized, such as by issuing n test messages or "pings", and calculating the response for each according to Eqn. (1), and then averaging the results, or alternatively taking the lowest value (i.e., which is ostensibly indicative of the best performance of the receiver/CPE).

In the event that the CPE is only one-way capable (i.e., no upstream communication capability), and the reply message cannot be sent, other mechanisms can be employed to determine network delay. For instance, in one such alternative, the CPE (via e.g., an application running thereon) can time-stamp receipt of the downstream test message (the transmission time of which is known) and either (i) save this information to a local storage device for later transmission to a third party entity via e.g., another non-MSO based communication channel, which when received by the third party entity, can be forwarded back to the MSO for processing; or (ii) immediately generate and transmit the timing information to the third party entity via the alternate communication channel.

Next, at step 318 of the method, the device response is utilized by e.g., the network latency characterization application 202 running on the network tuning record processing entity 200, to determine the network latency. For example, suppose it is known that the System Time message was transmitted to the device at 3:42:52 pm GMT, and further that the response message received from the device indicates that the current system time was 3:43:02 pm GMT when the message was received. The network latency application 202 is then able to deduce that the network latency for that particular device is 10 seconds (less the inherent device latency in processing the received message, if any, as previously determined).

The previously collected device latency information (step 312) and the network latency (determined at step 318) are then utilized in a system latency algorithm at step 320. The system latency algorithm is utilized to provide an overall latency for the system which takes into account both the network-related and the device-related latency.

In one embodiment, if one assigns the variable "A" to represent the device related latency, and the variable $t_1$ to represent the network latency, then the overall system latency T is equal to the sum of these values, or $$T = t_1 + A \qquad \text{Eqn. (2)}$$

To determine the overall system latency, T, one must first determine the unknown value of the network latency, $t_1$. To do this, a System Time message is utilized. For example, a System Time request may be sent to the device at time $S_{t0}$. In response to receiving the request, the device transmits a response which arrives back at the network at $t_{f0}$. The time at which the device reply to the request is received ($t_{f0}$) will necessarily equal the time at which the message was sent ($S_{t0}$) plus double the network latency (because the message is being transmitted and another message is being received, i.e., a "round trip" is made), see Eqn. (3).

$$t_{f0} = S_{t0} + (2t_1 + B) \qquad \text{Eqn. (3)}$$

Where B represents latency on the set top box in processing the message—as opposed to A (Eqn. 2) which represents latency on the video path in the set top box (after validation through characterization in the lab, this term can, in most cases be ignored). However it is noted that, where any significant processing is required or if for any other reason the device-related latency, A, affects the value of T, it must be added thereto.

Accordingly, in the case of Eqn. (3) (i.e., insignificant device processing), the unknown network latency ($t_1$) may be derived by the following:

$$t_1 = (t_{f0} - S_{t0} - B)/2 \qquad \text{Eqn. (4)}$$

referring back to Eqn. (2), the overall system latency (T) becomes:

$$T = t_1 + A = (t_{f0} - S_{t0} - B)/2 + A \qquad \text{Eqn. (5)}$$

The overall system latency (T) may then be optionally provided to the device for use thereon, as will be discussed below (step 322). However, it is appreciated that in an alternative embodiment, the system latency is maintained at the network entity 200, and applied to subsequently received tuning records, as also discussed below.

In yet another embodiment, the network tuning record processing entity 200 may be configured to iteratively cycle through the population of device in communication therewith to "ping" each one with a System Time or other such request. Such a system may be "tuned" to ensure that it takes up minimal bandwidth and overhead, while still sending a request to every device in the network at a frequency which will yield useful results (i.e., detect significant changes in network-related latency, such as due to operational changes, equipment failure, etc.).

Referring now to FIG. 3b, another embodiment of the method for latency identification and characterization is illustrated and described. As opposed to the method of FIG. 3a (which is primarily performed at the network tuning record processing entity 200), the method of FIG. 3b may be performed substantially at the client devices themselves.

As shown, per step 352, device-related latency information is collected. According to the embodiment of FIG. 3b, the device performing the method may have access to or knowledge of its own latency information. For instance, the device manufacturer may provide indigenous device-specific latency information prior to the device being installed at the customer premises or being used by the customer. The device is merely configured to access this pre-programmed information. Other approaches may be used as well, such as where the device is configured to "call out" to a third party or MSO server to obtain the configuration/latency information.

Next, per step 354, a message is sent to the network from the device (e.g., to a known network address, such as for a server). The transmitted message requires a response from the network, and at step 356, a response therefrom is received. The message sent upstream and/or the response message may comprise any number of message types. For example, the messages that are used in the regular dialog between a settop box and the SDV Server within the headend could be leveraged. However, it will be appreciated that any message which is timestamped by the network as to when it is received may be utilized according to the present embodiment.

At step 358, the received network response is used by e.g., the client latency characterization application 208 running on the CPE 106 to determine the network latency. For example, suppose it is known that the message was transmitted to the network at a first time (the client knows its local SI or other time reference when it transmits the test message), and that the response message was received at the network at a second time; as discussed above, these times may simply be subtracted (less any processing delays at the network-side responding entity) to determine the network-related latency.

The device latency information (step 352) and the network latency determined at step 358 are then utilized in a system latency algorithm at step 360. The system latency algorithm is utilized to provide an overall latency for the system which takes into account both the network-related and the device-related latency which is specific to the device type, as well as the particular path content and/or data must travel to reach that particular device. In one embodiment, the overall latency is determined utilizing an equation similar to that discussed above (i.e., Eqn. (5)).

In the event that the network-side processing delay (i.e., the time in responding to the client-generated message once received) is significant, the foregoing equation can be modified to account for this value, which can be e.g., empirically determined for the network-side responding entity by the MSO.

Figure 4:
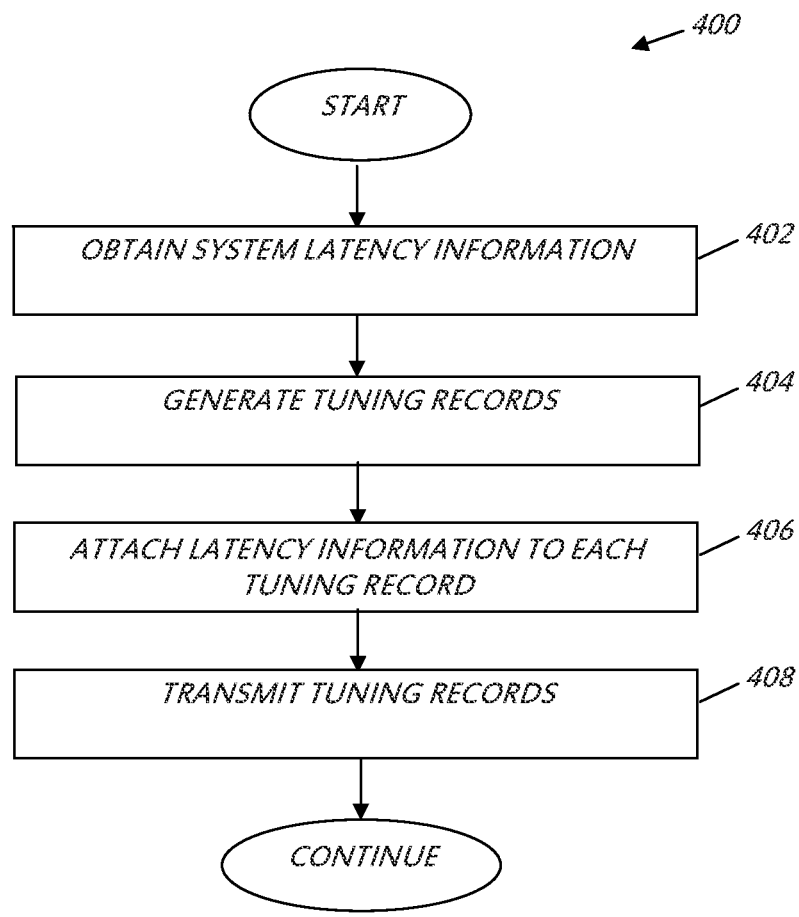
FIG. 4 is a logical flow diagram illustrating an exemplary embodiment of the method providing tuning records according to the present invention.

FIG. 4 illustrates an exemplary method for providing tuning records according to the present invention. As shown, per step 402, the overall system latency information is obtained. The system latency information may be obtained using e.g., any of the previously discussed methods of FIGS. 3, 3a, and/or 3b, or yet other methods recognized by those of ordinary skill given the present disclosure. As discussed above, the system latency may be determined: (i) at the network, such as at the network latency characterization application 202, (ii) at a third party entity, when provided sufficient information to perform the calculation, or (ii) at the client device itself, such as at the client latency characterization application 208.

Next, at step 404, tuning records are generated. Tuning records, as noted above, in the exemplary embodiment comprise information which is used to describe each action taken at a user device. For example, when a user requests to access programming, a tune-in record is created. Similarly, when a user changes a channel (i.e., requests different programming), a tune-away record is created (with respect to the first requested channel), and when the user turns off his device, a tune-out record is created. Additionally, records may be created which indicate activity with respect to trick modes functions such as fast forward, rewind, pause, etc. (e.g., time of invocation of the command, duration of the command, number of repeat or similar commands in a given time period, etc.). The tuning records may include for example the precise time at which the event of interest (e.g., user action) was performed or occurred, one or more channel or other program identifiers (e.g., tuned from Channel X, or tuned from Channel X to Channel Y), a device identifier, and an identifier of the action taken (e.g., tune-in, tune-out, tune-away, etc.). Various other alternative tuning record data constructs useful as part of the invention will also be recognized by those of ordinary skill given the present disclosure.

As noted above, tuning records may be generated by each of the devices across an entire MSO footprint, or within selected portions or subsets thereof. In one embodiment, the methods and apparatus discussed in previously referenced and incorporated by reference, co-owned, co-pending U.S. patent application Ser. No. 12/877,062 may be utilized for generating the aforementioned tuning records.

The tuning records are in one embodiment collected across all available platforms (including for example VOD consumption, interactive consumption, linear/broadcast consumption, DVR usage, EPG interaction, etc.) in order to gather user/audience information in real-time or near-real time, with associated actions of actual users or viewers.

The previously obtained latency information may be attached or appended to each tuning record (step 406), and these are then transmitted (step 408). In other words, the tuning records are enriched with the network or device determined overall system latency. The latency information may merely be transmitted alongside the tuning records with an indicator telling the receiving entity that the tuning record is to be associated with the latency information. Alternatively the device may attach the latency information by adjusting the timestamps of each record to account for the latency. For example, suppose a tuning record is collected at 11:42:36, and the overall system latency is established as 2 seconds, then the CPE 106 may adjust the collected time to 11:42:34 to reflect the network latency prior to transmitting the tuning record.

It is appreciated that while the exemplary embodiments described above attach the latency data to each tuning record created, the latency information can be aggregated or distributed across multiple records. For instance, the total latency (i.e., network-related plus device-related) should be largely constant for a given device for at least a period of time (assuming no major operational changes, etc.). Hence, records generated during that time can utilize a common single latency value if desired. In one such implementation, multiple records are aggregated at the CPE 106 over a prescribed period of time, and then "packaged" in a common data structure with a single appended latency value (or similarly, the records can be adjusted using the common latency value before transmission). This approach simplifies CPE-side processing and overhead.

It is further appreciated that the tuning records (having the overall system latency information attached, or being adjusted for the aforementioned latency) may be transmitted at step 408 to (i) a network 101 entity (such as the tuning record collection, validation and reporting entity 204 of the network tuning record processing entity, (ii) a proxy, such as one located at a local service node 182, and/or (iii) a network or third party analyzation entity 206 directly via the internet and/or an intermediary.

Furthermore, the records may be anonymized prior to transmission according to any number of anonymization techniques. For example, a cryptographic hash (e.g., MD5, SHA1, SHA2, HMAC) may be utilized to disguise the subscriber identity and/or CPE 106 identity. In one embodiment, the techniques for providing anonymity utilizing a cryptographic hash described in U.S. patent application Ser. No. 11/186,452 filed Jul. 20, 2005 and entitled "METHOD AND APPARATUS FOR BOUNDARY-BASED NETWORK OPERATION", which is incorporated herein by reference in its entirety, may be utilized in conjunction with the present invention. As disclosed therein, the identity of a subscriber device or subscriber is anonymized by using a one-way cryptographic hash coupled with an optional "opaque" variable which carries information relating to the subscriber device of the hash with which it is associated. The hash and opaque variable frustrate de-encryption or reverse-engineering of the individual subscriber's identity or specific location. Alternative methods of providing anonymization may also be utilized consistent with the present invention, including those discussed in previously referenced and incorporated, co-owned and co-pending U.S. patent application Ser. No. 12/877,062.

In an alternative embodiment, the system latency information is neither received nor attached (or applied) at the device, e.g., CPE 106. Rather, according to this embodiment, the network entity which determines the system latency (such as e.g., the network latency characterization application 202 running on the network tuning record processing entity 200 as discussed above with respect to FIG. 3a) stores the latency information, and applies it to the tuning records received from the CPE 106. The CPE 106 may comprise a "thin" client, meaning it may only be configured to collect and transmit tuning records, and not perform any processing or latency determination, but rather delegate this task to the network entity.

Figure 5:
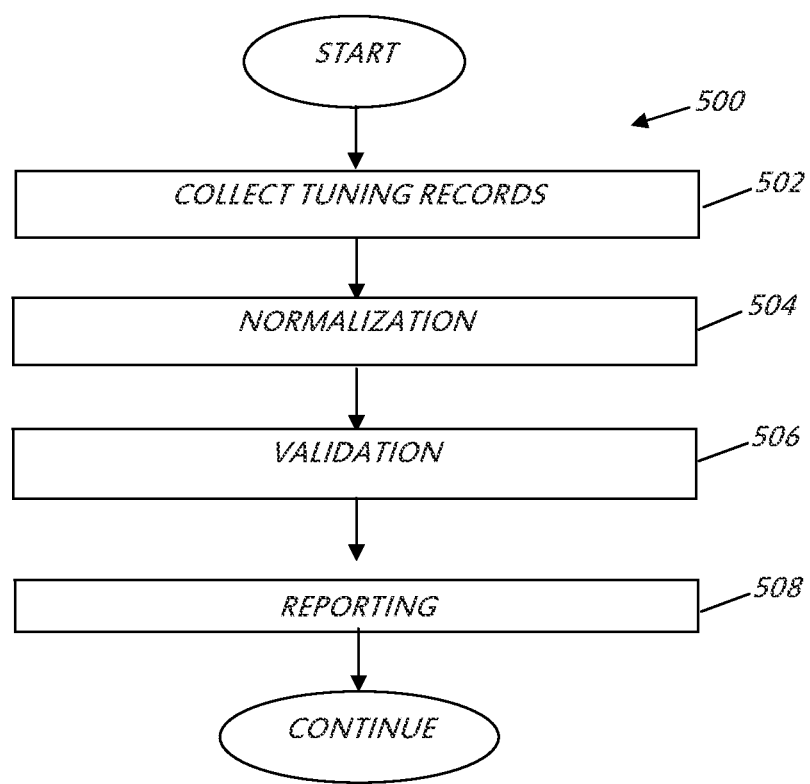
FIG. 5 is a logical flow diagram illustrating an exemplary embodiment of the method for processing tuning records according to the present invention.

FIG. 5 illustrates an exemplary embodiment of the method for processing tuning records according to the present invention. The receiving entity (e.g., the collection, validation and reporting entity 204 of the network tuning record processing entity, and/or another entity given this task) performs the method of FIG. 5 in order to, inter alia, obtain useful information from the tuning records.

At step 502, the tuning records are collected. As noted previously, these may be collected at e.g., an MSO network 101 entity, a proxy (which then forwards them on to a network entity), or a third party entity (e.g., web server). The records have attached latency information (as discussed above with respect to FIG. 4), or have otherwise been adjusted for latency before transmission.

At step 504, the receiving entity uses the latency information to normalize the tuning record data as required. That is to say, the receiving entity (e.g., network tuning record processing entity 200 of FIG. 2a) adjusts the timestamps for each usage event in the tuning records, so that these accurately reflect the actual time of the event taking into account overall system latency. In the instance where the CPE 106 which collected the records has adjusted the timestamp of each tuning record to account for the latency (as discussed above), the normalization step (step 504) is not necessary.

The tuning records are then validated at step 506. As noted previously, the aforementioned systems and methods enable collection of a very large amount of data representing each user action across an entire MSO footprint regardless of device, type of content (e.g., VOD content, DVR content, linear broadcast, etc.). Since the amount of data is so large, it generally must be validated to ensure there are no errors in the data in order to be relied upon by consumers of the data. In one embodiment, the methods of co-owned, co-pending U.S. patent application Ser. No. 12/829,104, filed Jul. 1, 2010, and entitled "APPARATUS AND METHOD FOR DATA COLLECTION AND VALIDATION", which is incorporated herein by reference in its entirety, may be utilized for validating the tuning records. As discussed therein, statistical methods (e.g., linear regression, log linear regression) are used to arrive at an expected value for one or more of the various fields and records of the collected data (i.e., tuning records). Collected data is compared to the derived (e.g., average) or expected value, and if the data is outside of one or more prescribed criteria (e.g., is a given number of standard deviations away from the expected value or more) indicating that the data quality may be unacceptable, an error message is generated and the data optionally excluded. The criteria used to judge the data (e.g., number of standard deviations which the data is permitted to vary from the expected value) may be determined by the network operator, or an algorithm/computer program. In a further variant, the system may be monitored proactively and alert the network operator in the instance erroneous data meeting the test(s) of significance is received. Still further, in one embodiment, the system may be configured to "learn" how data is corrected, eventually enabling data to be corrected automatically without requiring manual error correction.

Lastly, per step 508, the validated and normalized tuning records are reported to an analyzation entity 206. As previously noted, the analyzation entity 206 may be physically located at the MSO network 101, or remote thereto. Reporting the tuning records may include reporting only those records which are requested by the particular entity. Alternatively, the records may be provided on an "as needed" basis. For example, the analyzation entity 206 may be associated with a single advertising entity or content provider. The tuning records provided thereto may comprise only those records which relate to the advertisements or content associated with that particular advertiser or content provider, or alternatively those associated with a particular demographic or psychographic or geographical region which the advertiser is attempting to access with its advertising.

In yet another embodiment, reports may be generated at the MSO network 101 at step 508. Specifically, the tuning record collection, validation, and reporting entity 204 disposed at the network tuning record processing entity 200 may be configured to sort through the collected, normalized and validated data, and parse this data into usable segments. For example, the data may be segmented or filtered to reflect all usage for a particular household or device, usage across all subscribers for a particular program or advertisement, etc. Alternatively, reports may be generated on a per-user, per-household, and/or per-device basis. Literally any type of report may be generated given the collected data and ability to normalize the collected data to accurately and precisely identify the collection time.

In one exemplary embodiment, a single report may be generated illustrating (across a certain demographic of viewers of an advertisement) the number of viewers which tuned away, and precise times during the advertisement when the viewers did so taking into account the latency associated with each viewer. For example, a report may indicate that (i) Users A, B, C and D were viewing an advertisement, (ii) User A tuned away at precisely 12:32:02 (this time is an adjusted time which reflects the herein-described latency), (iii) Users B and C tuned away at precisely 12:32:57 (this time is also an adjusted time reflecting the herein-described latency), and (iv) User D did not tune away during the advertisement. Using this information, an advertiser is able to determine overall penetration of an advertisement by determining the difference between the number of viewers tuned in at the beginning of the advertisement and the number which tuned away. In the example above, the overall penetration is determined by subtracting 3 (the number of users which tuned away, Users A, B, and C) from 4 (the number of users which were tuned in at the beginning of the advertisement (Users A, B, C, and D).

Since the times indicated in the report have been normalized (adjusted to account for individual/specific latencies), the advertiser may also use the aforementioned report to determine which portions of an advertisement are not well received by the audience. Suppose for example that it appears that the majority of viewers who tuned away from an advertisement did so within the first five seconds thereof, the advertiser may determine that a new introductory section for the advertisement is needed. Alternatively, suppose the majority of viewers who tuned away did so at a time which correlates to the appearance or disappearance of a character, the end of a song, etc., the advertiser may associate this tune-away event with that character, song, etc.

As noted above, the aforementioned methods enable tuning data records to be collected with to-the-second accuracy if desired, so that viewership and user activity can be determined with respect to increasingly smaller intervals of time. Accordingly, in one embodiment, the reports generated at step 508 may include a per-household view of the precise moment within a given advertisement or program in which a viewer tuned to, tuned away, and/or tuned-out, utilized a trick mode operation, invoked another function (e.g., VoIP call), etc. As will be discussed below, various business rules may be applied in generating reports, including generating certain reports as a purchasable commodity.

Data Analysis—

As noted previously, the tuning records may be analyzed at e.g., the MSO network tuning record processing entity 200, and/or at a third party or non-MSO network entity (such as e.g., the analyzation entity 206).

In one embodiment, the normalized and validated tuning records may be analyzed in a manner similar to Nielson analysis, so as to determine viewership for a particular program, network, time of day, day of the week, etc. However, as noted above, this analysis may be further extended to a second-by-second look at programming and advertising content (as well as other content and/or data). The tuning records may also be analyzed for the purpose of providing targeted secondary content insertion opportunities. For example, if the collected data indicates that user or subscriber devices registered to the 92123 ZIP code often view particular programming, then the network tuning record processing entity 200 (or other entity receiving the normalized and validated tuning records) may indicate to an entity providing advertising or other secondary content to the users in that ZIP code (such as e.g., an analyzation entity 206 thereof) that targeted advertising may be provided to these devices during the particular programming. Such targeted advertising might address their common geography (e.g., a local upcoming event or service), a common demographic within that geography, and so forth.

In a further embodiment, the normalized and validated tuning records may be utilized by content and advertising providers to identify specific portions of provided content and/or advertising which are/are not being viewed (or are experiencing events such as tune-aways). The content provider (or advertiser) may then use this information to make subsequent content delivery decisions. For example, if a significant number of tuning records indicate that at particular time during an advertisement most viewers tune-away, the advertiser may review the advertisement for ineffective, unappealing content being displayed at that particular time (literally to the second) and make business decisions based thereon (such as removing the particular scene or image, replacing the entire advertisement with a substitute, etc.).

As yet another potential use, MSOs or advertisers may correlate multiple events within single premises or account together, so as to divine yet further insight into the effectiveness of the content. For instance, an advertisement asking viewers to call or text a certain number (say, to obtain information, enter a contest, etc.) might be followed by a VoIP or text message to that number by a viewing subscriber, thereby indicating at least ostensibly the level of penetration or effectiveness of the advertisement. If 40% of viewers who viewed the advertisement (i.e., did not tune away or tune out as indicated by the tuning records) and who have MSO VoIP service call the advertised number via their MSO VoIP service with a prescribed period of time (say, five minutes) after completion of the advertisement, then the advertisement might be deemed to have a very strong appeal or market penetration for the viewing audience.

Similarly, a user tuning to a linear broadcast channel and subsequently invoking a DVR function to record the program within a prescribed period after the tune-in might be indicative of a strong liking by that user.

Repetitive records for the same device/premises for the same content (e.g., advertisement) might also have utility for the MSO and/or advertiser. For example, if a given "saturation" advertisement campaign runs the same or complementary advertisements at a very high frequency (or "back to back"), an increase in tune-away or tune-out events for that premises/device for that same advertisement over time would indicate that the viewer has reached saturation, and they are affirmatively avoiding the advertisement. Note that many contemporary advertising schemes or plans utilize short (e.g., 15 second) "burst" advertisements that run in rapid succession. Under prior art approaches which are not capable of the granularity of the present invention, a viewer's split-second response to these very brief advertisements could not be accurately judged, since one could not be sure whether a user tuned away or tuned out after the completion of the advertisement, or sometime during. In contrast, the high degree of precision and reliability of the present invention advantageously affords an accurate picture of user behavior, even during such very brief segments.

Exemplary User Device—

Figure 6:
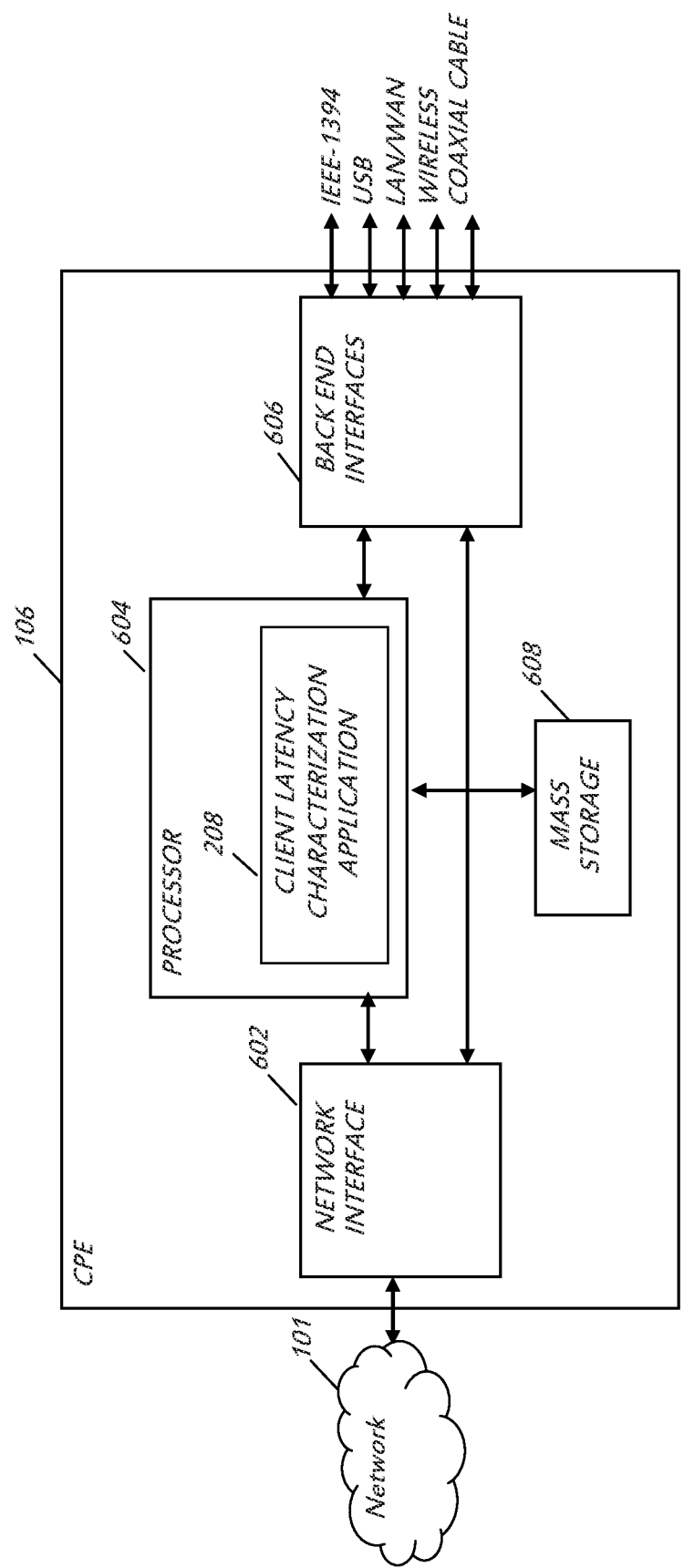
FIG. 6 is a block diagram illustrating an exemplary user device configured according to the present invention.

FIG. 6 illustrates an exemplary embodiment of a CPE 106 for use with the present invention. In one variant, this CPE 106 comprises a premises receiver such as a digital settop box (DSTB) or gateway, PC, or the like; however, it will be appreciated that the user device may further comprise a PMD, smartphone, laptop computer, or other user-operated device.

As shown in FIG. 6, the exemplary device 106 generally comprises a network interface 602 configured to interface with the network(s) 101 of FIGS. 1-1c, one or more digital processor(s) 604, storage device(s) 608, and a plurality of interfaces 606 (e.g., video/audio interfaces, IEEE-1394 "FireWire", wireless LAN/PAN/MAN) interfaces, USB, serial/parallel ports, HDMI, DisplayPort, etc.) to interface with other end-user apparatus such as televisions, personal electronics, computers, WiFi or other network hubs/routers, etc. In one embodiment, the device may comprise an Open-Cable (OCAP)-compliant embedded system having an RF front end (including tuner and demodulator/decryptors) for interface with an HFC network. Other components which may be utilized within the device (deleted from FIG. 6 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 6 may also provided with an OCAP 1.0-compliant application and Java-based middleware which, inter alia, manages the operation of the device and applications running thereon (including the herein described client latency characterization application 208). It will be recognized by those of ordinary skill that myriad different device and software architectures may be used consistent with the tuning functions of the present invention, the device of FIG. 6 being merely exemplary. For example, different middlewares (e.g., MHP, ARIB, or ACAP) may be used in place of the OCAP middleware of the illustrated embodiment.

In another embodiment, the CPE 106 comprises a converged premises device, such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety. In yet another embodiment, the CPE 106 may comprise a gateway device such as that discussed in previously referenced, co-owned, co-pending U.S. patent application Ser. No. 11/818,236 entitled "PREMISES GATE-

WAY APPARATUS AND METHODS FOR USE IN A CONTENT-BASED NETWORK".

In yet another embodiment, the CPE 106 comprises a media bridge apparatus such as that discussed in co-owned, co-pending U.S. patent application Ser. No. 12/480,597 filed Jun. 8, 2009 and entitled "MEDIA BRIDGE APPARATUS AND METHODS", incorporated herein by reference in its entirety. As discussed therein, the CPE 106 may act as a connection between a portable media device (PMD) and a user's home network. This bridging apparatus may be used, for example, to convert content stored on the PMD (e.g., an MP3 player such as an iPod®) to a format capable of being presented on a user's set-top box or other client device. Control of the presentation is also provided by the bridging apparatus. In one embodiment, the apparatus enables a user to access and control playback of media from a PMD via a user interface associated with a television, personal computer or other user device. The apparatus may also enable content stored on the PMD to be copied and stored on a user's digital video recorder (DVR) or other storage apparatus, optionally while maintaining appropriate copyright and digital rights management (DRM) requirements associated with the content being manipulated. The media bridging apparatus (e.g., CPE 106) can also work within a premises network or trusted domain for media content, thereby allowing a subscriber total mobility in the premises network. For example, media content from the PMD may be accessed via extant networks for distribution to any STB, PC, mobile device, or other PMD. The media bridging device may also utilize the existing premises network (including a network defined by coaxial cable in the premises, such as a MoCA-enabled network) to allow devices and DVRs to share media content with the PMD. According to this embodiment, device-related latency may further take into account latency associated with connected (or bridged) devices.

As previously noted, the CPE 106 of FIG. 6 may further comprise a client latency characterization application 208 in the form of e.g., a software application running on the CPE 106. This software application 208 may be configured to, when executed, perform any number of functions, including without limitation: (i) data collection regarding user- or device-specific activities such as tuning or activity logs, power on/off times/duration, PPV/VOD requests, frequency of use of other ancillary functions associated with the CPE, DVR or monitor operation and use (such as via communications from a connected DVR or monitor device), etc., (ii) determination of an overall system latency (as discussed above with respect to FIGS. 3 and 3b), (iii) application of the determined latency to collected data records (i.e., data normalization), (iv) data transmission, and/or (v) forming a cryptographic hash of one or more CPE-specific variables in order to maintain the anonymity of the CPE/subscriber with respect to transmitted data, as described elsewhere herein. Alternatively, additional applications may be provided to run on the client device 106 to perform one or more of the aforementioned functions. The client application may also be integrated with other applications or software running on the CPE 106 if desired.

In further embodiments, the CPE 106 may be further configured to run at least one application for: (i) data validation, (ii) identification and communication of data validity errors as determined by the aforementioned validation, and/or (iii) error logging and correction functions, as discussed previously herein.

The foregoing diversity of possible configurations of the CPE 106 illustrates the general network-agnosticism of the present invention; i.e., user events of interest may span literally from cable and satellite content delivery networks to unmanaged IP networks to local area networks to ad hoc wireless networks, and beyond. A "tune" event may comprise e.g., a linear broadcast channel change via a front-panel function or remote on a DSTB, or selection of an IPTV stream on a PC or other IP-enabled device, or selection of a VOD or PPV program, or invocation of a VoIP call, or selection of a hyperlink, or yet other types of activities.

Network Tuning Record Processing Entity—

Figure 7:
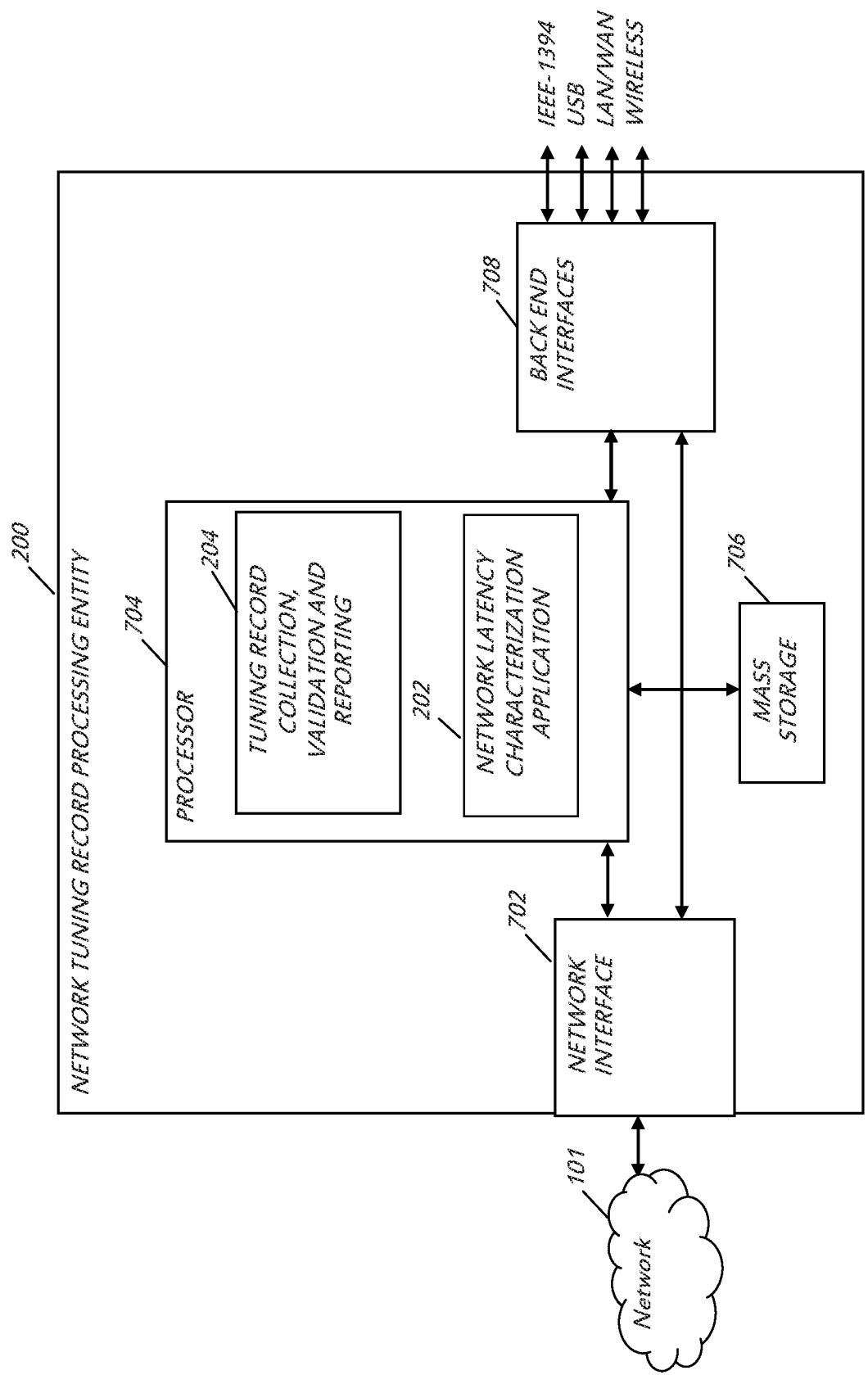
FIG. 7 is a block diagram illustrating an exemplary network tuning record processing entity according to the present invention.

Referring now to FIG. 7, an exemplary configuration network tuning record processing entity 200 is described in detail. As noted above, in certain embodiments, the functions of the network tuning record processing entity 200 may be distributed across a plurality of devices, and may further make use of a proxy (not shown). Hence, the illustrated tuning record processing entity 200 may be disposed at the headend 150, a local service node 182, and/or at a third party.

The tuning record processing entity 200 generally comprises a network interface 702 for communication with the network 101, a processor subsystem 704 and associated storage 706, as well as additional interfaces 708 for communication with other entities.

The processor subsystem 704 is configured to run a tuning record collection, validation and reporting application 204 and a network latency characterization application 202 thereon. As noted previously, the foregoing may comprise e.g., distributed applications at a headend or third party entity, or yet other configurations of software known in the arts.

The tuning record collection, validation and reporting application 204, when executed, enables inter alia the request and/or receipt of tuning records from the user devices. The application 204 validates the data, implements one or more automated error correction mechanisms, analyzes data to generate reports therefrom, ensures subscriber anonymity, and/or transmits at least portions of the data to an analyzation entity 206 (such as those being associated with a particular content provider or advertiser). The network latency characterization application 202, when executed, is used to determine an overall system latency per device or per grouping of devices (such as via the methods discussed in FIGS. 3-3b), which may be provided to each device respectively.

It is appreciated that the network tuning record processing entity 200 may comprise additional components (not shown) and functionality well known to those of ordinary skill in the network and embedded system fields, and accordingly not described further herein. For example, management or supervisory processes, and/or business rules software (described in greater detail below) may be run on the network tuning record processing entity 200. Fail-over protection, additional physical or network security mechanisms, etc. may also be implemented.

Business/Operational Rules Engine—

In another aspect of the invention, the aforementioned network tuning record processing entity 200 and/or the CPE 106 (e.g., including one or more computer programs for providing the above-mentioned functionalities thereof) optionally include an entity having an operations and/or business rules "engine". This engine comprises, in an exemplary embodiment, a series of software routines that are adapted to control the determination of the overall system latency, the application of the latency to collected tuning records, as well as the actual collection, validation, analysis and transmission of data. These rules may also be fully integrated within the aforementioned one or more computer programs, and controlled via the entity on which the program is run, or remotely if desired (such as having the individual CPE "reconfigurable" as to the type, frequency, scope, etc. of data they collect and/or process). In effect, the rules engine comprises a supervisory entity which monitors and selectively controls the aforementioned functions at a higher level, so as to implement desired operational or business rules of the MSO or other parties of interest (e.g., content sources or advertisers).

The rules engine can be considered an overlay of sorts to the algorithms of the previously described computer applications. For example, the exemplary computer application may invoke certain operational protocols or decision processes based on data received (e.g., historical activity or user data, subscriber preferences, etc.), as well as network operational or historical data, demographic data, geographic data, etc. However, these processes may not always be compatible with higher-level business or operational goals, such as maximizing profit on a network-wide basis, or system reliability and/or flexibility. Moreover, the computer application being "supervised" may be operating on a per-CPE, per-household, or per-request basis (i.e., the collected data may be collected for individual CPE effectively in isolation, and analysis may be performed without considering larger patterns or decisions being made in the same service group, or network as a whole).

Hence, when imposed, the business/operational rules of the engine can be used to dynamically (or manually) control the operation of the aforementioned processes in conjunction with the latency determination, latency application, data collection, validation, analysis and transmission functions previously described.

For example, one rule implemented by the rules engine may comprise selectively performing the above functions resulting in collected viewership data only for certain users; e.g., those who have agreed to have their viewership data collected (whether for consideration or otherwise). Accordingly, only those users who affirmatively "opt in" will have data collected about their household or devices. In another variant, certain content access, delivery or utilization features (e.g., enhanced functionality such as interactive programming, special features, advanced trailers, etc.) may only be provided to users who agree to have data collected.

Another business rule relates to distribution of the normalized and validated tuning records; i.e., they may only be provided to particular parties (e.g., third parties such as third party analyzation entities 206) who meet certain criteria. For instance, these criteria might relate to (i) reliability and/or quality standards; (ii) profitability or revenue potential; (iii) pre-qualification or certification by the MSO (irrespective of whether they would add revenue or profit for the MSO), such as for sufficient security for the data, sufficient processing capability; or (iv) the ability to provide certain time or quality or service (QoS) guarantees, etc., so that the MSO may ensure that the data will be protected and used efficiently and properly.

As previously noted, the "event" data obtained using the present invention (in various stages of processing, ranging from being merely latency-corrected to being validated, latency corrected, filtered, and enriched with ancillary data) may form a commodity of sorts which can be bought, sold, or bartered under any number of different business models. For example, validated and latency-corrected records might be standardized according to a prescribed or de facto format or protocol, such that their use by various different entities (whether MSO, ISP, cellular service provider, advertiser, studio, etc.) is enabled. As can be appreciated, the ability to accurately characterize the behavior of millions of different users (many of whose demographics are known a priori) with respect to explicit events or portions of perceived content is a highly valuable commodity, especially for purposes of increasing advertising penetration and effectiveness (e.g., by proper placement and timing of advertisements, removal of objectionable or ineffective advertisements, etc.), and increasing MSO subscriber satisfaction (e.g., by giving subscribers a user experience which most closely tailors to their individual desires and needs). Hence, the present invention contemplates that the aforementioned records may be sold as commodities, and even develop a secondary market of sorts for buying, selling and trading based on factors such as the demographics the data represents (i.e., very wealthy individuals or those who make frequent purchases historically), the type of events captured (e.g., certain events may be difficult to obtain data on, and hence more highly valued), the "half life" of the data and/or how long ago it was collected (i.e., certain types of data may only be relevant or useful for a certain limited period of time), and so forth.

Many other approaches and combinations of various operational and business paradigms are envisaged consistent with the invention, as will be recognized by those of ordinary skill when provided this disclosure.

It will be recognized that while certain aspects of the invention are described in teens of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized client device for use in a content delivery network, said computerized client device comprising:

a first apparatus configured to receive a first application, said first application configured to determine a system latency specific to said computerized client device in said content delivery network;

a storage apparatus in data communication with said first apparatus and configured to store said received first application; and computerized logic in data communication with at least said storage apparatus and configured to cause said computerized client device to:

collect data representative of latency information attributable to said computerized client device;

send a message to a network entity at a first time, said message configured to invoke a response from said network entity;

receive said response from said network entity, said response comprising data indicative of a second time; and apply at least one algorithm to:
calculate a network-related latency, said network-related latency comprising at least a difference between said second and said first time;
utilize said latency information attributable to said computerized client device and said network-related latency to determine said system latency specific to said computerized client device in said content delivery network;
incorporate said system latency specific to said computerized client device in said content delivery network into at least one record associated with said latency information attributable to said computerized client device; and
anonymize said at least one record via use of a one-way cryptographic hash coupled with an opaque variable.

2. The client device of claim 1, wherein said network-related latency further comprises a processing delay comprising a time taken by said network entity to respond to said message upon receipt thereof.

3. The client device of claim 1, wherein:
said application of said at least one algorithm is further configured to utilize said latency information attributable to said computerized client device and said network-related latency to determine a particular path configured to be used to deliver a digitally rendered content element to said computerized client device; and
said anonymization of said at least one record via use of said one-way cryptographic hash coupled with said opaque variable comprises anonymization of data representative of said computerized client device or user thereof, thereby frustrating identification of said user or a specific location associated with said user.

4. The client device of claim 1, wherein said data representative of said latency information is associated with one or more trick-mode capabilities of said computerized client device and said data representative of said at least one record comprises a time at which a trick-mode function occurred at said computerized client device.

5. A computerized method for determining a system latency specific to an individual one of a plurality of computerized devices in a content delivery network, said method comprising:
determining, based at least in part on data representative of said one or more tuning records relating to one or more interactions of said individual one of said plurality of computerized devices with one or more digitally rendered content elements, a value for latency attributable to said individual one of said plurality of computerized devices;
sending a message to said individual one of said plurality of computerized devices at a first time;
receiving a response to said message, said response indicating a second time;
applying at least one algorithm, said applying said at least one algorithm comprising:
(i) determining a portion of a difference between said second and said first time, said portion of said difference attributable to a one-way traversal of said network to said individual one of said plurality of computerized devices; and
(ii) combining said portion of said difference with said value for latency attributable to said individual one of said plurality of computerized devices to obtain said system latency specific to said individual one of said plurality of computerized devices;
applying said system latency to said data representative of said one or more tuning records; and
performing one or more tests to determine a validity of said data representative of said one or more tuning records with said system latency applied thereto, said performing said one or more tests comprising:
(i) utilizing one or more statistical methods to determine an expected value for one or more data fields of said data representative of said one or more tuning records; and
(ii) comparing said expected value to said data representative of said one or more records according to one or more prescribed criteria;
wherein said one or more data fields comprise at least an error type field, and said one or more prescribed criteria comprises a predetermined number of standard deviations above or below said expected value.

6. The computerized method of claim 5, wherein:
said applying said at least one algorithm further comprises;
said applicating said system latency to said data representative of said one or more tuning records comprises adjusting a timestamp of said data representative of said one or more tuning records to account for said system latency, said timestamp comprising data representative of a time at which collection of said data representative of said one or more tuning records occurred; and
said one or more interactions of said individual one of said plurality of devices comprise one or more tune events associated with said one or more digitally rendered content elements.

7. The computerized method of claim 5, wherein said one or more digitally rendered content elements comprise one or more advertisements.

8. The computerized method of claim 5, further comprising:
filtering said data according to at least one criterion to generate a subset of said data; and
transmitting said subset of said data to an entity outside of an infrastructure of said content delivery network.

9. The computerized method of claim 5, wherein said message indicates said first time therein.

10. The computerized method of claim 5, wherein said data representative of said one or more records comprises time data, and said method further comprises removing, based on an adjustment of said time data, a particular scene or image from said one or more digitally rendered content elements.

11. The computerized method of claim 5, wherein said data representative of said one or more records comprises time data, and said method further comprises replacing, based on an adjustment of said time data, said one or more digitally rendered content elements with one or more secondary digitally rendered content elements.

12. The computerized method of claim 5, further comprising, when said determination indicates that said individual ones of said one or more tuning records are valid, transmit at least validated one of said individual ones of said one or more tuning records to an entity outside of an infrastructure of said content delivery network, said entity able to provide certain time or quality or service (QoS) guarantees.

13. A computer readable apparatus comprising a non-transitory medium comprising at least one computer program having a plurality of instructions, said plurality of instructions configured to, when executed by a processing apparatus:
receive data representative of device latency information associated with a computerized device;
based on said data representative of said device latency information, determine a value for latency attributable to said computerized device;
send a communication to said computerized device at a first time;
receive a response to said communication, said response indicative of a second time; and
apply at least one algorithm to:
(i) determine a portion of a difference between said second and said first time, said portion of said difference attributable to a one-way traversal of said network to said computerized device;
(ii) combine said portion of said difference with said value for said latency attributable to said computerized device to obtain a system latency specific to said computerized device; and
based on said value for said latency attributable to said computerized device meeting a prescribed criteria with respect to said portion of said difference, adjust data of at least one tuning record associated with said computerized device to account for said system latency, or otherwise, adjust data of said at least one tuning record associated with said computerized device to account for said said portion of said difference such that said latency attributable to said computerized device is ignored.

14. The computer readable apparatus of claim 13, wherein said one or more digitally rendered content elements comprise one or more advertisements.

15. The computer readable apparatus of claim 13, wherein said plurality of instructions are further configured to, when executed, perform one or more tests to determine a validity of said at least one tuning record.

16. The computer readable apparatus of claim 13, wherein said at least one tuning record comprises a plurality of data and said plurality of instructions are further configured to, when executed, filter said plurality of records according to at least one criterion to generate a subset of said plurality of data, and transmit said subset of said plurality of data to an entity outside a boundary of said content delivery network.

17. The computer readable apparatus of claim 13, wherein said device latency information is received from a manufacturer.

18. A computerized apparatus configured to determine a system latency specific to an individual one of a plurality of computerized devices associated with a content delivery network, said apparatus comprising:
processor apparatus;
a storage element in data communication with said processor apparatus, said storage element comprising at least one computer program, said at least one program comprising a plurality of instructions configured to, when executed by said processor apparatus:
collect data representative of at least one record associated with said individual one of said plurality of computerized devices;
determine a value for latency attributable to said individual one of said plurality of computerized devices;
send a message to said individual one of said plurality of computerized devices at a first time, said message configured to invoke a response from said individual one of said plurality of computerized devices;
receive a response to said message from said individual one of said plurality of computerized devices, wherein said response indicates a second time; and
apply at least one routine to:
(i) determine a portion of a difference between said second and said first time, said portion of said difference attributable to a one-way traversal of said network to said individual one of said plurality of computerized devices; and
(ii) combine said portion of said difference with said value for latency attributable to said individual one of said plurality of computerized devices to obtain a system latency for said individual one of said plurality of computerized devices;
apply said system latency to said at least one record;
determine a validity of the at least one record with the system latency applied thereto, the determination of the validity comprising:
(i) derivation of an expected value for the at least one record;
(ii) configuration of a range of acceptable values for said t at least one record based at least in part on said expected value; and
(iii) a comparison of the said at least one record to said range of acceptable values.

19. The computerized apparatus of claim 18, wherein said plurality of instructions are further configured to, when executed by said processor apparatus:
generate a report, said generation comprising application of a filter to said data according to at least one attribute of interest associated with said individual one of said plurality of computerized devices; and
wherein said filter of said data according to said at least one attribute of interest is utilized to generate a subset of said data, and said plurality of instructions are further configured to, when executed: transmit said subset of said data to an entity outside of said content delivery network.

20. The computerized apparatus of claim 19, wherein said at least one attribute of interest comprises a common demographic between said individual one of said plurality of computerized devices and said plurality of computerized devices.

21. The computerized apparatus of claim 18, wherein said message indicates said first time therein.

22. The computerized apparatus of claim 18, wherein said application of said system latency to said at least one record comprises adjustment of a timestamp of said at least one record to account for said system latency, said timestamp comprising a time at which said data representative of said at least one record was collected.

* * * * *

UNITED STATES PATENT AND TRADEMARK OFFICE
CERTIFICATE OF CORRECTION

PATENT NO. : 10,728,129 B2  
APPLICATION NO. : 14/589947  
DATED : July 28, 2020  
INVENTOR(S) : Justin Tidwell et al.

Page 1 of 1

It is certified that error appears in the above-identified patent and that said Letters Patent is hereby corrected as shown below:

On the Title Page

Currently Reads:  
"(74) Attorney, Agent, or Firm – Gadzdzinski & Associates, PC"

Should Read:  
--(74) Attorney, Agent, or Firm – Gazdzinski & Associates, PC--

Signed and Sealed this  
Twenty-fifth Day of August, 2020

Andrei Iancu  
*Director of the United States Patent and Trademark Office*